(12) United States Patent
Char et al.

(10) Patent No.: US 7,769,647 B1
(45) Date of Patent: Aug. 3, 2010

(54) METHOD AND SYSTEM FOR PROVIDING A YEAR-ROUND TAX MONITOR

(75) Inventors: R. Jason Char, San Diego, CA (US); Melanie Ann Novak, San Diego, CA (US); John R. Caldwell, San Diego, CA (US); Geoffrey C. Howard, San Diego, CA (US); William Nolte, Encinitas, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 12/183,252

(22) Filed: Jul. 31, 2008

(51) Int. Cl.
*G06F 17/22* (2006.01)
(52) U.S. Cl. .......................... 705/31; 705/30
(58) Field of Classification Search ............ 705/31
See application file for complete search history.

(56) References Cited

U.S. PATENT DOCUMENTS

| | | | | |
|---|---|---|---|---|
| H1830 H | * | 1/2000 | Petrimoulx et al. | 705/31 |
| 2002/0178039 A1 | * | 11/2002 | Kennedy | 705/7 |
| 2003/0144930 A1 | * | 7/2003 | Kulkarni et al. | 705/31 |
| 2003/0195780 A1 | * | 10/2003 | Arora et al. | 705/7 |
| 2004/0088233 A1 | * | 5/2004 | Brady et al. | 705/31 |
| 2004/0254927 A1 | * | 12/2004 | Lang et al. | 707/5 |

* cited by examiner

*Primary Examiner*—F. Ryan Zeender
*Assistant Examiner*—Fateh M Obaid
(74) *Attorney, Agent, or Firm*—Gunnison, McKay & Hodgson, L.L.P.; Philip McKay

(57) ABSTRACT

A process for providing a year-round tax monitor whereby baseline tax data and current year-to-date tax data for a user is obtained. Data representing current tax year directives made by the user, and/or data representing tax related choices made by the user in the current tax year to date, and/or data representing tax related events associated with the user in the current tax year to date is also obtained. Using the baseline tax data, and/or current year-to-date tax data, and/or the data representing current tax year directives made by the user, and/or the data representing tax related choices made by the user in the current tax year, and/or the data representing tax related events associated with the user for the current tax year, an estimate and/or projection of tax liability for the current tax year is calculated and a projected tax refund that will be owed to, or a tax liability that will owed by, the user for the current tax year is estimated. The estimated tax refund that will be owed to, or a tax liability that will be owed by, the user for the current tax year is then provided to the user via a tax monitor widget displayed on a display device accessible by the user.

49 Claims, 3 Drawing Sheets

METHOD AND SYSTEM FOR PROVIDING A YEAR-ROUND TAX MONITOR

BACKGROUND

Virtually every taxpayer in the United States is aware that April 15 is the date on which their taxes for the previous calendar year are due. However, despite this advance knowledge, throughout most of any given tax year many taxpayers have little or no insight into their tax status, and/or the tax ramifications of their financial decisions. Indeed, in many cases, taxpayers are almost completely unaware of their current tax liabilities for a given tax year until they are forced to focus on their tax situation, typically after the end of the tax year, and after all of the financial decisions for the tax year have been irrevocably made.

This lack of tax awareness over most of the tax year exists, at least in part, because many taxpayers do not want to think about their taxes year round. However, the fact that many of these taxpayers do not have the ability to easily, and affordably, monitor their tax situation over course of the entire year also plays a significant part in creating this lack of tax awareness.

As a result of their lack of tax awareness over most of the tax year, many taxpayers do not currently have the information available to them that is required to make tax savvy decisions throughout the tax year. Consequently, many taxpayers are often unaware of the significant control they have over their tax liabilities. In addition, because many taxpayers do not currently have the ability to track their tax status easily, and affordably, over course of the entire year, many taxpayers are caught by surprise each year when they are finally informed of their tax liabilities. In some cases, this surprise takes the form of a tax refund that is less, or even more, than that expected. In other cases, the taxpayer can find they unexpectedly owe taxes to the IRS, or owe an amount that is greater than expected.

As discussed above, the current situation where many taxpayers do not have the ability to easily, and affordably, monitor their tax liabilities over course of the entire year often results in uninformed financial decisions being made by the taxpayers, and/or the taxpayers forfeiting significant control over their tax liabilities, and/or incorrect assumptions being made by taxpayers regarding their tax liabilities and/or refunds. This situation is less than ideal for both the taxpayers and the taxing authorities.

SUMMARY

In accordance with one embodiment, a system and method for providing a year-round tax monitor includes a process for providing a year-round tax monitor whereby, in one embodiment, baseline tax data and current year-to-date tax data for a user is obtained. In one embodiment, data representing current tax year directives made by the user, and/or data representing tax related choices made by the user in the current tax year to date, and/or data representing tax related events associated with the user in the current tax year to date is also obtained. In one embodiment, using the baseline tax data, and/or current year-to-date tax data, and/or the data representing current tax year directives made by the user, and/or the data representing tax related choices made by the user in the current tax year, and/or the data representing tax related events associated with the user for the current tax year, an estimate and/or projection of the user's tax liability for the current tax year is calculated and/or updated as needed. In one embodiment, the estimate and/or projection of the user's tax liability for the current tax year is then used to estimate a projected tax refund that will be owed to, or a tax liability that will owed by, the user for the current tax year. In one embodiment, the estimated tax refund that will be owed to, or a tax liability that will owed by, the user for the current tax year is provided to the user via a tax monitor widget displayed on a display device accessible by the user. In one embodiment, the tax monitor widget is updated on demand, and/or as the underlying tax data changes throughout the tax year, and/or at periodic intervals automatically.

In one embodiment, at least part of the baseline tax data for the user is tax and/or filing data from previous tax years, including, in one embodiment, the most recent previous tax year, i.e., the last tax year.

In one embodiment, at least part of the baseline tax data for the user is obtained from the user via manual input by the user, and/or an agent for the user, using a user interface screen and/or a user interface device such as, but not limited to, a keyboard, mouse, voice recognition system, touch screen, touch pad, or any other device and/or mechanism capable of providing user input to a computing system, or for translating user actions into computing system operations, as discussed herein, and/or known in the art at the time of filing, and/or as developed after the time of filing.

In one embodiment, at least part of the baseline tax data for the user is obtained from electronic filing data associated with the previous tax years, including, in one embodiment, the most recent previous tax year. In one embodiment, at least part of the baseline tax data for the user is obtained by scanning hard copies of previous tax year filings into an electronic format. In one embodiment, at least part of the baseline tax data for the user is obtained as electronic data from previous tax year electronic filings/documents.

In one embodiment, at least part of the baseline tax data for the user is obtained from and/or through one or more computing system implemented data management systems, such as, but not limited to, a computing system implemented tax preparation system, a computing system implemented personal financial management system, a computing system implemented payroll system, a computing system implemented healthcare system, and/or any other computing system implemented data management system, as discussed herein, and/or as known in the art at the time of filing, and/or as developed after the time of filing.

In one embodiment, at least part of the baseline tax data for the user is obtained from a database such as those discussed herein, and/or as known in the art at the time of filing, and/or as developed after the time of filing. In one embodiment, at least part of the baseline tax data for the user is obtained via a network such as those discussed herein, and/or as known in the art at the time of filing, and/or as developed after the time of filing. In one embodiment, at least part of the baseline tax data for the user is obtained from a computer program product such as those discussed herein, and/or as known in the art at the time of filing, and/or as developed after the time of filing.

In one embodiment, at least part of the baseline tax data for the user is obtained from any combination of the above listed sources and/or from any other source of baseline tax data for the user, as discussed herein, and/or as known in the art at the time of filing, and/or as developed after the time of filing.

In one embodiment, the current year-to-date tax data for the user includes, but is not limited to, the user's actual and/or projected income in the current tax year-to-date from all sources, the user's deductible actual and/or projected expenses incurred in the current tax year-to-date, and/or any other tax related income and expense data associated with the user in the current tax year-to-date. In addition, in one embodiment, the user provides hypothetical baseline tax data and then uses the process for providing a year-round tax monitor to show the tax ramifications of the hypothetical baseline tax data. In this way, the process for providing a year-round tax monitor is used to educate the user about how past choices affected his or her taxes.

In one embodiment, at least part of the current year-to-date tax data for the user is obtained from the user via manual input by the user, and/or an agent for the user, using a user interface screen and/or a user interface device such as, but not limited to, a keyboard, mouse, voice recognition system, touch screen, touch pad, or any other device and/or mechanism capable of providing user input to a computing system, or for translating user actions into computing system operations, as discussed herein, and/or known in the art at the time of filing, and/or as developed after the time of filing.

In one embodiment, at least part of the current year-to-date tax data for the user is obtained from and/or through one or more computing system implemented data management systems, such as, but not limited to, a computing system implemented tax preparation system, a computing system implemented personal financial management system, a computing system implemented payroll system, a computing system implemented healthcare management system, and/or any other computing system implemented data management system, as discussed herein, and/or as known in the art at the time of filing, and/or as developed after the time of filing.

In one embodiment, at least part of the current year-to-date tax data for the user is obtained from a database such as those discussed herein, and/or as known in the art at the time of filing, and/or as developed after the time of filing. In one embodiment, at least part of the current year-to-date tax data for the user is obtained via a network such as those discussed herein, and/or as known in the art at the time of filing, and/or as developed after the time of filing. In one embodiment, at least part of the current year-to-date tax data for the user is obtained from a computer program product such as those discussed herein, and/or as known in the art at the time of filing, and/or as developed after the time of filing.

In one embodiment, at least part of the current year-to-date tax data for the user is obtained from any combination of the above listed sources and/or from any other source of the current year-to-date tax data for the user, as discussed herein, and/or as known in the art at the time of filing, and/or as developed after the time of filing. In addition, in one embodiment, the user provides hypothetical current year tax data and then uses the process for providing a year-round tax monitor to show the tax ramifications of the hypothetical current year tax data.

In one embodiment, current tax year directives made by the user include, but are not limited to, tax exemptions declared by the user for the current tax year, any changes in the withholdings made by the user for the current tax year, any changes in the allocation of funds to eligible retirement plans made by the user for the current tax year, or any other directives made by the user for the current tax year that effect the user's tax withholdings. In addition, in one embodiment, the user can provide hypothetical current tax year directive data and then use the process for providing a year-round tax monitor to show the tax ramifications of the hypothetical current tax year directives before making actual decisions.

In one embodiment, at least part of the data representing current tax year directives made by the user is obtained from the user via manual input by the user, and/or an agent for the user, using a user interface screen and/or a user interface device such as, but not limited to, a keyboard, mouse, voice recognition system, touch screen, touch pad, or any other device and/or mechanism capable of providing user input to a computing system, or for translating user actions into computing system operations, as discussed herein, and/or known in the art at the time of filing, and/or as developed after the time of filing.

In one embodiment, at least part of the data representing current tax year directives made by the user is obtained from and/or through one or more computing system implemented data management systems, such as, but not limited to, a computing system implemented tax preparation system, a computing system implemented personal financial management system, a computing system implemented payroll system, a computing system implemented healthcare system, and/or any other computing system implemented data management system, as discussed herein, and/or as known in the art at the time of filing, and/or as developed after the time of filing.

In one embodiment, at least part of the data representing current tax year directives made by the user is obtained from a database such as those discussed herein, and/or as known in the art at the time of filing, and/or as developed after the time of filing. In one embodiment, at least part of the data representing current tax year directives made by the user is obtained via a network such as those discussed herein, and/or as known in the art at the time of filing, and/or as developed after the time of filing. In one embodiment, at least part of the data representing current tax year directives made by the user is obtained from a computer program product such as those discussed herein, and/or as known in the art at the time of filing, and/or as developed after the time of filing.

In one embodiment, at least part of the data representing current tax year directives made by the user is obtained from any combination of the above listed sources and/or from any other source of the data representing current tax year directives made by the user, as discussed herein, and/or as known in the art at the time of filing, and/or as developed after the time of filing.

In one embodiment, tax related choices made by the user in the current tax year include, but are not limited to, choices made by the user to buy or sell assets such as stock, real estate, etc., healthcare program choices such as participation in various employer and/or government sponsored/supported healthcare insurance/expense programs, choices regarding the use/withdraw of retirement funds, retirement itself, and/or any other choices made by the user in the current tax year that have potential tax consequences. In addition, in one embodiment, the user can provide hypothetical tax related choices in the current tax year and then use the process for providing a year-round tax monitor to show the tax ramifications of the hypothetical tax related choices before the choices are actually made.

In one embodiment, at least part of the data representing tax related choices made by the user in the current tax year is obtained from the user via manual input by the user, and/or an agent for the user, using a user interface screen and/or a user interface device such as, but not limited to, a keyboard, mouse, voice recognition system, touch screen, touch pad, or any other device and/or mechanism capable of providing user input to a computing system, or for translating user actions into computing system operations, as discussed herein, and/or or known in the art at the time of filing, and/or as developed after the time of filing.

In one embodiment, at least part of the data representing tax related choices made by the user in the current tax year is obtained from and/or through one or more computing system implemented data management systems, such as, but not limited to, a computing system implemented tax preparation system, a computing system implemented personal financial management system, a computing system implemented payroll system, a computing system implemented healthcare management system, and/or any other computing system implemented data management system, as discussed herein, and/or as known in the art at the time of filing, and/or as developed after the time of filing.

In one embodiment, at least part of the data representing tax related choices made by the user in the current tax year is obtained from a database such as those discussed herein, and/or as known in the art at the time of filing, and/or as developed after the time of filing. In one embodiment, at least part of the data representing tax related choices made by the user in the current tax year is obtained via a network such as those discussed herein, and/or as known in the art at the time of filing, and/or as developed after the time of filing. In one embodiment, at least part of the data representing tax related choices made by the user in the current tax year is obtained from a computer program product such as those discussed herein, and/or as known in the art at the time of filing, and/or as developed after the time of filing.

In one embodiment, at least part of the data representing tax related choices made by the user in the current tax year is obtained from any combination of the above listed sources and/or from any other source of the data representing tax related choices made by the user in the current tax year, as discussed herein, and/or as known in the art at the time of filing, and/or as developed after the time of filing.

In one embodiment, tax related events associated with the user for the current tax year to date include, but are not limited to, the user moving to a new location, the user changing marital status, the user having a child, the user suffering significant illness and/or disability, a job change, a raise or a new pay structure, retirement and/or change in employment status of a spouse, or any other event occurring in the current tax year that potentially has tax ramifications. In addition, in one embodiment, the user can provide hypothetical tax related events and then use the process for providing a year-round tax monitor to show the tax ramifications of the hypothetical tax related events before the events take place.

In one embodiment, at least part of the data representing tax related events associated with the user for the current tax year is obtained from the user via manual input by the user, and/or an agent for the user, using a user interface screen and/or a user interface device such as, but not limited to, a keyboard, mouse, voice recognition system, touch screen, touch pad, or any other device and/or mechanism capable of providing user input to a computing system, or for translating user actions into computing system operations, as discussed herein, and/or known in the art at the time of filing, and/or as developed after the time of filing.

In one embodiment, at least part of the data representing tax related events associated with the user for the current tax year is obtained from and/or through one or more computing system implemented data management systems, such as, but not limited to, a computing system implemented tax preparation system, a computing system implemented personal financial management system, a computing system implemented payroll system, computing system implemented healthcare system and/or any other computing system implemented data management system, as discussed herein, and/or as known in the art at the time of filing, and/or as developed after the time of filing.

In one embodiment, at least part of the data representing tax related events associated with the user for the current tax year is obtained from a database such as those discussed herein, and/or as known in the art at the time of filing, and/or as developed after the time of filing. In one embodiment, at least part of the data representing tax related events associated with the user for the current tax year is obtained via a network such as those discussed herein, and/or as known in the art at the time of filing, and/or as developed after the time of filing. In one embodiment, at least part of the data representing tax related events associated with the user for the current tax year is obtained from a computer program product such as those discussed herein, and/or as known in the art at the time of filing, and/or as developed after the time of filing.

In one embodiment, at least part of the data representing tax related events associated with the user for the current tax year is obtained from any combination of the above listed sources and/or from any other source of the data representing tax related events associated with the user for the current tax year, as discussed herein, and/or as known in the art at the time of filing, and/or as developed after the time of filing.

In one embodiment, using the baseline tax data, and/or current year-to-date tax data, and/or the data representing current tax year directives made by the user, and/or the data representing tax related choices made by the user in the current tax year, and/or the data representing tax related events associated with the user for the current tax year, an estimate and/or projection of the user's tax liability for the current tax year is calculated, at least in part, using a tax rules engine and/or database.

In one embodiment, the tax rules engine and/or database are a pre-existing tax rules engines and/or database created by and/or using data from, one or more computing system implemented data management systems, such as a computing system implemented tax management and/or preparation system. Many computing system implemented data management systems, and, in particular, many computing system implemented tax management and/or preparation systems include, and/or have access to, tax rules engines and/or databases that contain tax rules and data for various regions and for various situations.

In one embodiment, the baseline tax data, and/or current year-to-date tax data, and/or the data representing current tax year directives made by the user, and/or the data representing tax related choices made by the user in the current tax year, and/or the data representing tax related events associated with the user for the current tax year, is provided to the tax rules engine and/or database and the tax rules engine and/or database processes the data and provides an estimate and/or projection of tax liability for the current tax year.

In one embodiment, using the baseline tax data, and/or current year-to-date tax data, and/or the data representing current tax year directives made by the user, and/or the data representing tax related choices made by the user in the current tax year, and/or the data representing tax related events associated with the user for the current tax year, an estimate and/or projection of tax liability for the current tax year is calculated based on analysis of any changes between baseline tax data and the current year-to-date tax data, and/or the data representing current tax year directives made by the user, and/or the data representing tax related choices made by the user in the current tax year, and/or the data representing tax related events associated with the user for the current tax year, and/or any changes in the applicable tax laws between the baseline tax data year and the current tax year.

In one embodiment, using the baseline tax data, and/or current year-to-date tax data, and/or the data representing current tax year directives made by the user, and/or the data representing tax related choices made by the user in the current tax year, and/or the data representing tax related events associated with the user for the current tax year, an estimate and/or projection of tax liability for the current tax year is calculated using any method, means and/or mechanism for calculating an estimate and/or projection of the tax liability for a given tax year, as discussed herein, and/or as known in the art at the time of filing, and/or as developed after the time of filing.

In one embodiment, the estimate and/or projection of tax liability for the current tax year is then used to estimate a projected tax refund that will be owed to, or a tax liability that will owed by, the user for the current tax year by comparing the estimate and/or projection of tax liability for the current tax year and the tax withholdings, and/or taxes prepaid, and/or tax credits associated with, the user for the current tax year.

In one embodiment, data representing the estimated tax refund that will be owed to, or a tax liability that will owed by, the user for the current tax year is provided to the user via a tax monitor widget displayed on a display device on any computing system accessible by the user, such as those discussed herein, and/or as known in the art at the time of filing, and/or as developed after the time of filing.

Conventionally, widgets are interactive virtual tools that provide single-purpose services. However, more recently, "website support widgets" have been developed that provide a user guidance and/or support for specific supported websites. Typically, these website support widgets support, and/or provide functionality and tools, and/or provide a data gathering/help interface, for one or more specific websites associated with a common topic and/or service.

As used herein, the terms "widget" or "desktop widget" are used interchangeably and include, but are not limited to, a desktop-based, or any computing system-based mini-application that displays discrete information, as discussed herein, and/or as known in the art at the time of filing, and/or as developed after the time of filing. As used herein, the terms "widget" or "desktop widget" also includes, but is not limited to, mobile widgets as discussed herein, and/or as known in the art at the time of filing, and/or as developed after the time of filing. As used herein, the terms "widget" or "desktop widget" also includes, but is not limited to, "website support widgets" as discussed herein, and/or as known in the art at the time of filing, and/or as developed after the time of filing.

In one embodiment, the estimated tax refund that will be owed to, or a tax liability that will owed by, the user for the current tax year displayed to the user via the tax monitor widget is updated upon user demand via manual input by the user, and/or an agent for the user, using a user interface screen and/or a user interface device such as, but not limited to, a keyboard, mouse, voice recognition system, touch screen, touch pad, or any other device and/or mechanism capable of providing user input to a computing system, or for translating user actions into computing system operations, as discussed herein, and/or known in the art at the time of filing, and/or as developed after the time of filing.

In one embodiment, the estimated tax refund that will be owed to, or a tax liability that will owed by, the user for the current tax year displayed to the user via the tax monitor widget is updated periodically and/or automatically at regular intervals.

In one embodiment, the estimated tax refund that will be owed to, or a tax liability that will owed by, the user for the current tax year displayed to the user via the tax monitor widget is updated when the underlying baseline tax data, and/or current year-to-date tax data, and/or the data representing current tax year directives made by the user, and/or the data representing tax related choices made by the user in the current tax year, and/or the data representing tax related events associated with the user for the current tax year changes, and/or changes in the applicable tax laws.

In addition, in one embodiment, the user can provide hypothetical baseline tax data, and/or hypothetical current year-to-date tax data, and/or hypothetical data representing current tax year directives made by the user, and/or hypothetical data representing tax related choices made by the user in the current tax year, and/or hypothetical data representing tax related events associated with the user for the current tax year, and/or hypothetical changes thereto, and then use the process for providing a year-round tax monitor to show the estimated tax refund that will be owed to, or a tax liability that will owed by, the user for the current tax year under the hypothetical conditions.

Using the process for providing a year-round tax monitor disclosed herein, taxpayers are provided the ability to easily, and affordably, monitor their tax liabilities over the course of the entire year and/or under hypothetical conditions. Consequently, using the process for providing a year-round tax monitor disclosed herein, a taxpayer can obtain tax information and make better informed financial decisions throughout the year, and/or obtain significant control over their tax liabilities. In addition, using the process for providing a year-round tax monitor disclosed herein, there is less likelihood of the taxpayer making incorrect assumptions regarding their tax liabilities and/or refunds. Consequently, using the process for providing a year-round tax monitor disclosed herein, both the taxpayers and the taxing authorities are benefited.

Figure 1:
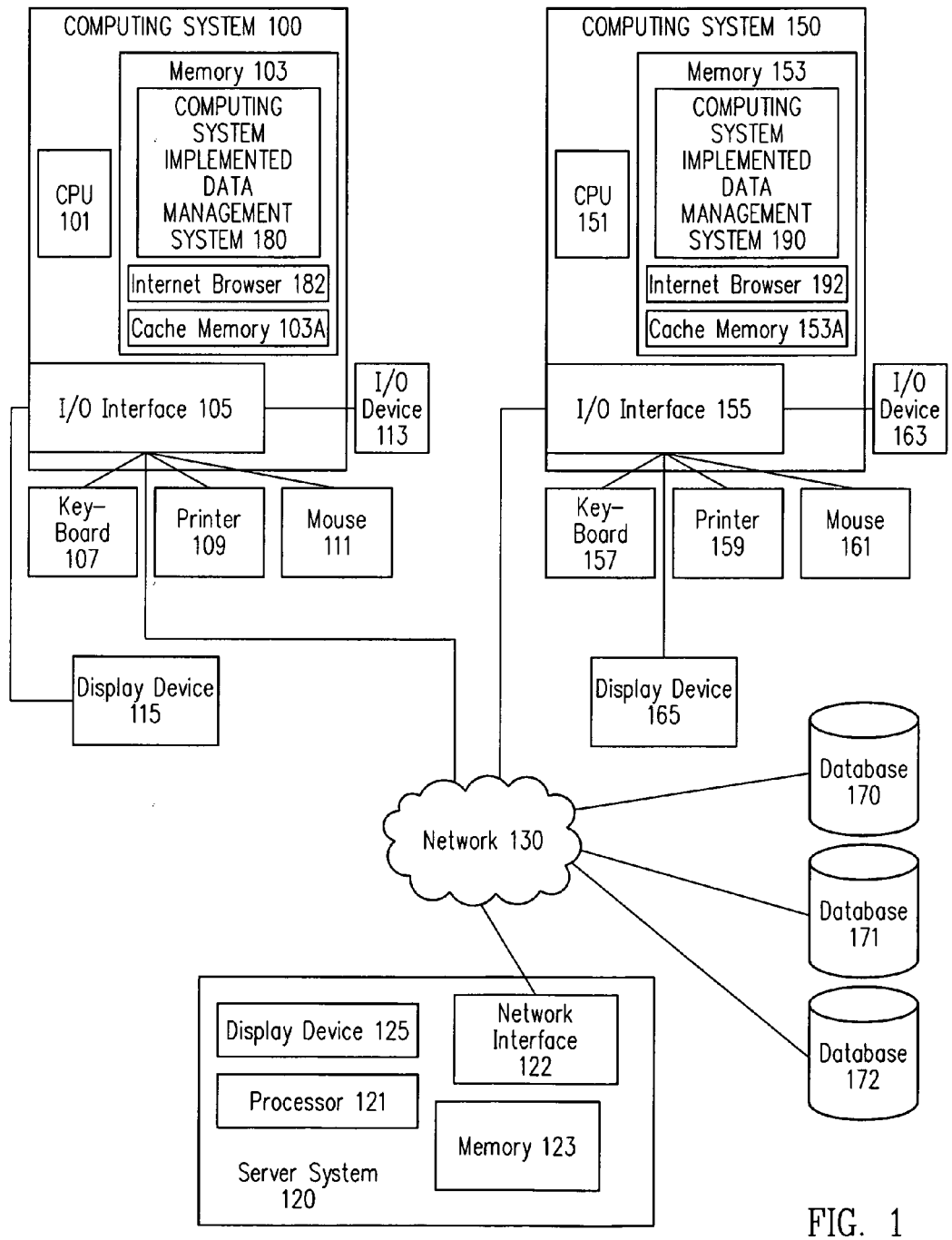
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be embodied in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a system and method for providing a year-round tax monitor includes a process for providing a year-round tax monitor whereby, in one embodiment, baseline tax data and current year-to-date tax data for a user is obtained. In one embodiment, data representing current tax year directives made by the user, and/or data representing tax related choices made by the user in the current tax year to date, and/or data representing tax related events associated with the user in the current tax year to date is also obtained. In one embodiment, using the baseline tax data, and/or current year-to-date tax data, and/or the data representing current tax year directives made by the user, and/or the data representing tax related choices made by the user in the current tax year, and/or the data representing tax related events associated with the user for the current tax year, an estimate and/or projection of the user's tax liability for the current tax year is calculated and/or updated as needed. In one embodiment, the estimate and/or projection of the user's tax liability for the current tax year is then used to estimate a projected tax refund that will be owed to, or a tax liability that will owed by, the user for the current tax year. In one embodiment, the estimated tax refund that will be owed to, or a tax liability that will owed by, the user for the current tax year is provided to the user via a tax monitor widget displayed on a display device accessible by the user. In one embodiment, the tax monitor widget is updated on demand, and/or as the underlying tax data changes throughout the tax year, and/or at periodic intervals automatically.

Hardware System Architecture

FIG. 1 is a block diagram of an exemplary hardware architecture for implementing one embodiment of a system and method for providing a year-round tax monitor, such as exemplary process 200 (FIG. 2) discussed herein, that, returning to FIG. 1, includes: a computing system 100, e.g., a first computing system; a computing system 150, e.g., a second computing system; a server system 120; and databases 170, 171 and 172, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented data management system 180 such as any computing system implemented data management system discussed herein, known in the art at the time of filing, and/or as developed thereafter. In one embodiment, computing system implemented data management system 180 is stored, in whole, or in part, in memory system 103, and is used by, or includes, or is accessed by, a process for providing a year-round tax monitor (not shown in FIG. 1; see FIG. 2).

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for providing a year-round tax monitor and/or a computing system implemented data management system are entered, in whole, or in part, into computing system 100 via I/O device 113, such as from a CD, DVD, floppy disk, portable hard drive, memory stick, download site, or other medium and/or computer program product as discussed herein.

In one embodiment, computing system 100 also includes an Internet browser capability 182 that, in one embodiment, includes a search engine (not shown) and is stored, in whole, or in part in memory 103.

In one embodiment, baseline tax data for one or more users, and/or current year-to-date tax data for one or more users, and/or data representing current tax year directives made by one or more users, and/or data representing tax related choices made by one or more users in the current tax year, and/or data representing tax related events associated with one or more users for the current tax year, and/or data representing an estimate and/or projection of tax liability for the current tax year for one or more users, and/or data representing an estimated tax refund that will be owed to, or a tax liability that will owed by, one or more users for the current tax year, is entered and/or stored, in whole, or in part, in memory system 103, and is used by, or is accessed by, a process for providing a year-round tax monitor and/or one or more computing system implemented data management systems.

In one embodiment, computing system 100 is a computing system that is accessible by the one or more users. In one embodiment, computing system 100 is used, and/or accessible, by another computing system, such as computing system 150 (discussed below).

In one embodiment, computing system 100 is used, controlled, and/or accessible by, a provider of and/or a computing system implemented data management system and data representing all, or part, of general business data and/or financial data and/or tax data associated with one or more users is stored in computing system 100.

Computing system 100 can be any computing system as discussed herein and/or as known in the art at the time of filing and/or as developed thereafter, that includes components that can execute all, or part, of a process for providing a year-round tax monitor, and/or a computing system implemented data management system, in accordance with at least one of the embodiments as described herein.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 also includes an Internet browser capability 192 that, in one embodiment, includes a search engine (not shown) and is stored, in whole, or in part in memory 153.

In one embodiment, memory system 153 includes all, or part, of a computing system implemented data management system 190, such as any computing system implemented data management system discussed herein, and/or known in the art at the time of filing, and/or as developed thereafter. In one embodiment, computing system implemented data management system 190 is stored, in whole, or in part, in memory system 153, and is used by, or includes, or is accessed by, a process for providing a year-round tax monitor.

In one embodiment, baseline tax data for one or more users, and/or current year-to-date tax data for one or more users, and/or data representing current tax year directives made by one or more users, and/or data representing tax related choices made by one or more users in the current tax year, and/or data representing tax related events associated with one or more users for the current tax year, and/or data representing an estimate and/or projection of tax liability for the current tax year for one or more users, and/or data representing an estimated tax refund that will be owed to, or a tax liability that will owed by, one or more users for the current tax year, is stored, in whole, or in part, in memory system 153, and is used by, or includes, or is accessed by, a process for providing a year-round tax monitor.

In one embodiment, computing system 150 is a computing system accessible by one or more users. In one embodiment, computing system 150 is used, and/or accessible, by another computing system, such as computing system 100.

Computing system 150 can be any computing system as discussed herein and/or as known in the art at the time of filing and/or as developed thereafter, that includes components that can execute all, or part, of a process for providing a year-round tax monitor, and/or a computing system implemented data management system, in accordance with at least one of the embodiments as described herein.

Also shown in FIG. 1 are exemplary databases 170, 171, and 172. In one embodiment, databases 170, 171, and 172 are data storage devices, designated server systems or computing systems, or designated portions of one or more server systems or computing systems, such as computing systems 100, 150 and server system 120, or distributed databases, or external and/or portable hard drives. In one embodiment, databases 170, 171, and 172 are dedicated mass storage devices implemented in software, hardware, or a combination of hardware and software. In one embodiment, databases 170, 171, and 172 include a web-based function. As discussed in more detail below, in one embodiment, databases 170, 171, and 172 are representative of: one or more tax rules engines and/or databases; and/or one or more databases containing baseline tax data for one or more users; and/or one or more databases containing current year-to-date tax data for one or more users; and/or one or more databases containing data representing current tax year directives made by one or more users; and/or one or more databases containing data representing tax related choices made by one or more users in the current tax year; and/or one or more databases containing data representing tax related events associated with one or more users for the current tax year; and/or one or more databases containing data representing an estimate and/or projection of tax liability for the current tax year for one or more users; and/or one or more databases containing data representing an estimated tax refund that will be owed to, or a tax liability that will owed by, one or more users for the current tax year.

In one embodiment, the data stored, in whole, or in part, in databases 170, 171, and 172, is used by, or is accessed by, a process for providing a year-round tax monitor. In one embodiment, databases 170, 171, and 172 are accessible by one or more users. In one embodiment, databases 170, 171, and 172 are used, and/or accessible, by a computing system, such as computing systems 100 and/or 150, and/or a server system, such as sever system 120 (discussed below).

In one embodiment, databases 170, 171, and 172 are used, controlled, and/or accessible by, a provider of, and/or, a computing system implemented data management system.

In one embodiment, computing systems 100 and 150, and databases 170, 171, and 172, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, the data stored, in whole, or in part, in server system 120, is used by, or is accessed by, a process for providing a year-round tax monitor. In one embodiment, server system 120 is accessible by one or more users. In one embodiment, server system 120 is used, and/or accessible, by a computing system, such as computing systems 100 and/or 150, and/or one or more databases, such as databases 170, 171, and 172. In one embodiment, server system 120 is used, controlled, and/or accessible by, a provider of, and/or, a computing system implemented data management system.

In one embodiment, server system 120 is representative of: one or more tax rules engine servers and/or databases; and/or one or more servers/databases containing baseline tax data for one or more users; and/or one or more servers/databases containing current year-to-date tax data for one or more users; and/or one or more servers/databases containing data representing current tax year directives made by one or more users; and/or one or more servers/databases containing data representing tax related choices made by one or more users in the current tax year; and/or one or more servers/databases containing data representing tax related events associated with one or more users for the current tax year; and/or one or more servers/databases containing data representing an estimate and/or projection of tax liability for the current tax year for one or more users; and/or one or more servers/databases containing data representing an estimated tax refund that will be owed to, or a tax liability that will owed by, one or more users for the current tax year.

Network 130 can be any network or network system as discussed herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100 and 150, databases 170, 171, and 172, server system 120, and their respective components are shown for illustrative purposes only and that other architectures with more or fewer components can implement, and benefit from, the invention. Moreover, one or more components of computing system 100, computing system 150, databases 170, 171, and 172, and server system 120 may be located remotely from their respective system and accessed via network 130. In addition, the particular type of, and configuration of, computing systems 100 and 150, databases 170, 171, and 172, and server system 120 are not relevant.

As discussed in more detail below, in one embodiment, a process for providing a year-round tax monitor, and/or a computing system implemented data management system, and/or baseline tax data for one or more users, and/or current year-to-date tax data for one or more users, and/or data representing current tax year directives made by one or more users, and/or data representing tax related choices made by one or more users in the current tax year, and/or data representing tax related events associated with one or more users for the current tax year, and/or data representing an estimate and/or projection of tax liability for the current tax year for one or more users, and/or data representing an estimated tax refund that will be owed to, or a tax liability that will owed by, one or more users for the current tax year, is stored, in whole, or in part, in memory system 103 and/or cache memory 103A, of computing system 100, and/or memory system 153 and/or cache memory 153A of computing system 150, and/or in server memory system 123 of server system 120 and/or in databases 170, 171, and 172, and executed on computing system 100 and/or computing system 150. As used herein, a memory refers to a volatile memory, a non-volatile memory, or any combination of the two.

Although a process for providing a year-round tax monitor, and/or a computing system implemented data management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing a year-round tax monitor and/or a computing system implemented data management system is capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for providing a year-round tax monitor, and/or a computing system implemented data management system, baseline tax data for one or more users, and/or current year-to-date tax data for one or more users, and/or data representing current tax year directives made by one or more users, and/or data representing tax related choices made by one or more users in the current tax year, and/or data representing tax related events associated with one or more users for the current tax year, and/or data representing an estimate and/or projection of tax liability for the current tax year for one or more users, and/or data representing an estimated tax refund that will be owed to, or a tax liability that will owed by, one or more users for the current tax year, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

As used herein, the terms "user" and "taxpayer" are used interchangeably to include, but are not limited to, any person, party, business, system, application, organization, and/or entity interacting with, interfacing with, contacting, viewing, providing data to, accepting data from, requesting data from, and/or otherwise using, and/or being associated with data being processed by, the process for providing a year-round tax monitor for any purpose. Herein the term "supplementary user tax data for the current tax year" includes, but is not limited to, data representing current tax year directives made by the user, and/or data representing tax related choices made by the user in the current tax year, and/or data representing tax related events associated with the user for the current tax year to date.

Herein the term "financial institution" includes, but is not limited to, any entity, party, person, application and/or system, such as, but not limited to, banks, credit card companies, asset account companies, and/or investment firms, that engages in money/asset/debt management and/or financial transaction management/recording and/or display.

As used herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "computing system implemented data management system" includes, but is not limited to: computing system implemented tax preparation systems, packages, programs, modules, or applications; computing system implemented personal financial management systems, packages, programs, modules, or applications; computing system implemented business systems, packages, programs, modules, or applications; computing system implemented financial institution management systems, packages, programs, modules, or applications; computing system implemented accounting and/or invoicing systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filing or as developed later.

As used herein, the term "network" is used to denote any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as discussed herein, known at the time of filing, or as developed thereafter.

In accordance with one embodiment, a system and method for providing a year-round tax monitor includes a process for providing a year-round tax monitor whereby, in one embodiment, baseline tax data and current year-to-date tax data for a user is obtained. In one embodiment, data representing current tax year directives made by the user, and/or data representing tax related choices made by the user in the current tax year to date, and/or data representing tax related events associated with the user in the current tax year to date is also obtained. In one embodiment, using the baseline tax data, and/or current year-to-date tax data, and/or the data representing current tax year directives made by the user, and/or the data representing tax related choices made by the user in the current tax year, and/or the data representing tax related events associated with the user for the current tax year, an estimate and/or projection of the user's tax liability for the current tax year is calculated and/or updated as needed. In one embodiment, the estimate and/or projection of the user's tax liability for the current tax year is then used to estimate a projected tax refund that will be owed to, or a tax liability that will owed by, the user for the current tax year. In one embodiment, the estimated tax refund that will be owed to, or a tax liability that will owed by, the user for the current tax year is provided to the user via a tax monitor widget displayed on a display device accessible by the user. In one embodiment, the tax monitor widget is updated on demand, and/or as the underlying tax data changes throughout the tax year, and/or at periodic intervals automatically.

Figure 2:
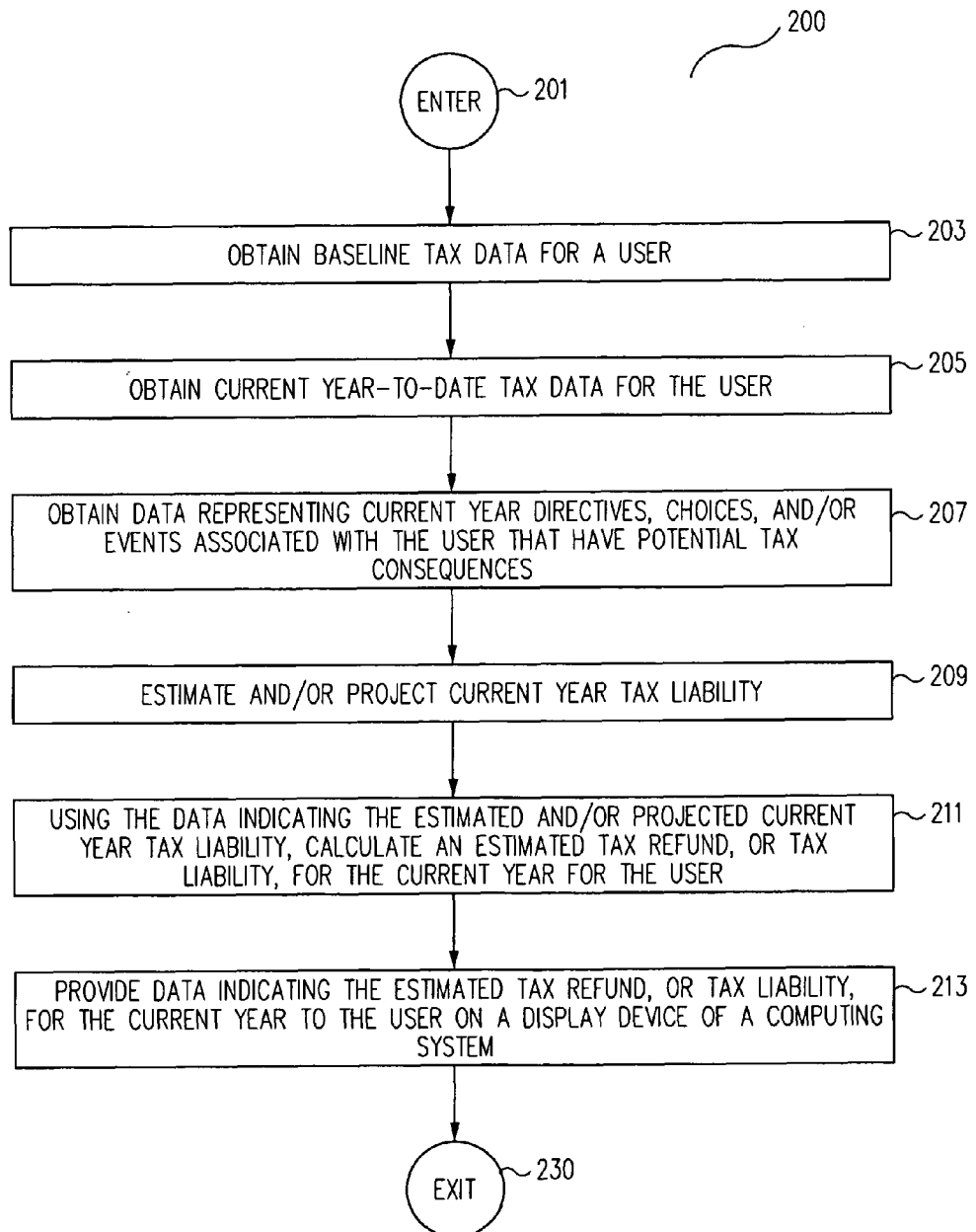
FIG. 2 is a flow chart depicting a process for providing a year-round tax monitor in accordance with one embodiment.

FIG. 2 is a flow chart depicting a process for providing a year-round tax monitor 200 in accordance with one embodiment. Process for providing a year-round tax monitor 200 begins at ENTER OPERATION 201 of FIG. 2 and process flow proceeds to OBTAIN BASELINE TAX DATA FOR A USER OPERATION 203.

In one embodiment, at OBTAIN BASELINE TAX DATA FOR A USER OPERATION 203 baseline tax data for a user is obtained.

In one embodiment, at least part of the baseline tax data for the user obtained at OBTAIN BASELINE TAX DATA FOR A USER OPERATION 203 is tax and/or filing data from previous tax years, including, in one embodiment, the most recent previous tax year, i.e., the last tax year.

In addition, in one embodiment, at OBTAIN BASELINE TAX DATA FOR A USER OPERATION 203, the user provides hypothetical baseline tax data and then uses process for providing a year-round tax monitor 200 to show the tax ramifications of the hypothetical baseline tax data. In this way, process for providing a year-round tax monitor 200 is used to educate the user about how past choices affected his or her taxes.

In one embodiment, at least part of the baseline tax data for the user is obtained at OBTAIN BASELINE TAX DATA FOR A USER OPERATION 203 from the user via manual input by the user, and/or an agent for the user, using a user interface screen on a display device, such as display devices 115, 165, and/or 125 of FIG. 1, and/or a user interface device, such as, but not limited to, a keyboard such as keyboards 107 and/or 111, a mouse, such as mice 111 and/or 161 of FIG. 1, a voice recognition system, a touch screen, a touch pad, or any other device and/or mechanism capable of providing user input to a computing system, such as computing system s 100 and/or 150 of FIG. 1, or for translating user actions into computing system operations, as discussed herein, and/or known in the art at the time of filing, and/or as developed after the time of filing.

Returning to FIG. 2, in one embodiment, at least part of the baseline tax data for the user is obtained at OBTAIN BASELINE TAX DATA FOR A USER OPERATION 203 from electronic filing data associated with the previous tax years, including, in one embodiment, the most recent previous tax year. In one embodiment, at least part of the baseline tax data for the user is obtained at OBTAIN BASELINE TAX DATA FOR A USER OPERATION 203 by scanning hard copies of previous tax year filings into an electronic format. In one embodiment, at least part of the baseline tax data for the user is obtained at OBTAIN BASELINE TAX DATA FOR A USER OPERATION 203 as electronic data from previous tax year electronic filings/documents.

In one embodiment, at least part of the baseline tax data for the user is obtained at OBTAIN BASELINE TAX DATA FOR A USER OPERATION 203 from and/or through one or more computing system implemented data management systems such as computing system implemented data management systems 180 and/or 190 of FIG. 1. In one embodiment, the computing system implemented data management systems can be, but not limited to, computing system implemented tax preparation systems, computing system implemented personal financial management systems, computing system implemented payroll systems, computing system implemented healthcare systems, and/or any other computing system implemented data management systems, as discussed herein, and/or as known in the art at the time of filing, and/or as developed after the time of filing.

Returning to FIG. 2, in one embodiment, at least part of the baseline tax data for the user is obtained at OBTAIN BASELINE TAX DATA FOR A USER OPERATION 203 from a database such as databases 170, 171 and/or 172 of FIG. 1 and/or any of those discussed herein, and/or as known in the art at the time of filing, and/or as developed after the time of filing. Returning to FIG. 2, in one embodiment, at least part of the baseline tax data for the user is obtained at OBTAIN BASELINE TAX DATA FOR A USER OPERATION 203 via a network such as network 130 of FIG. 1 and/or any of those discussed herein, and/or as known in the art at the time of filing, and/or as developed after the time of filing. In one embodiment, at least part of the baseline tax data for the user is obtained at OBTAIN BASELINE TAX DATA FOR A USER OPERATION 203 from a computer program product such as those discussed herein, and/or as known in the art at the time of filing, and/or as developed after the time of filing.

In one embodiment, at least part of the baseline tax data for the user is obtained at OBTAIN BASELINE TAX DATA FOR A USER OPERATION 203 via any electronic data transfer and/or communication mechanism such as, but not limited to: networks of computing systems, as discussed herein, including public networks such as the Internet; cellular networks; websites; e-mail; electronic attachments to e-mail; text messages; cable television, satellite television, and/or "on demand" television networks and/or services; data embedded in digital media such as DVDs, CDs, and MP3 files; data displayed in on-line digital media sites; and/or any other electronic data transfer and/or communication mechanism as discussed herein, and/or known in the art at the time of filing, and/or as developed after the time of filing.

In one embodiment, at least part of the baseline tax data for the user is obtained at OBTAIN BASELINE TAX DATA FOR A USER OPERATION 203 from any combination of the above listed sources and/or from any other source of baseline tax data for the user, as discussed herein, and/or as known in the art at the time of filing, and/or as developed after the time of filing.

As discussed in more detail below, in one embodiment, the baseline tax data for the user obtained at OBTAIN BASELINE TAX DATA FOR A USER OPERATION 203 is used by process for providing a year-round tax monitor 200 to identify changes in the user's tax data between the baseline tax years and the current tax year.

In one embodiment, once baseline tax data for a user is obtained at OBTAIN BASELINE TAX DATA FOR A USER OPERATION 203, process flow proceeds to OBTAIN CURRENT YEAR-TO-DATE TAX DATA FOR THE USER OPERATION 205.

In one embodiment, at OBTAIN CURRENT YEAR-TO-DATE TAX DATA FOR THE USER OPERATION 205 current year-to-date tax data for a user is obtained.

In one embodiment, the current year-to-date tax data for the user obtained at OBTAIN CURRENT YEAR-TO-DATE TAX DATA FOR THE USER OPERATION 205 includes, but is not limited to: the user's income in the current tax year-to-date from all sources; the user's deductible expenses incurred in the current tax year-to-date; and/or any other tax related income and expense data associated with the user in the current tax year-to-date.

In addition, in one embodiment, at OBTAIN CURRENT YEAR-TO-DATE TAX DATA FOR THE USER OPERATION 205, the user provides hypothetical current year tax data and then uses process for providing a year-round tax monitor 200 to show the tax ramifications of the hypothetical current year tax data. In this way, process for providing a year-round tax monitor 200 is used to inform the user of effect of the hypothetical current year tax data on his or her taxes.

In one embodiment, at least part of the current year-to-date tax data for the user is obtained at OBTAIN CURRENT YEAR-TO-DATE TAX DATA FOR THE USER OPERATION 205 from the user via manual input by the user, and/or an agent for the user, using a user interface screen on a display device, such as display devices 115, 165, and/or 125 of FIG. 1, and/or a user interface device, such as, but not limited to, a keyboard such as keyboards 107 and/or 111, a mouse, such as mice 111 and/or 161 of FIG. 1, a voice recognition system, a touch screen, a touch pad, or any other device and/or mechanism capable of providing user input to a computing system, such as computing system s 100 and/or 150 of FIG. 1, or for translating user actions into computing system operations, as discussed herein, and/or known in the art at the time of filing, and/or as developed after the time of filing.

Returning to FIG. 2, in one embodiment, at least part of current year-to-date tax data for the user is obtained at OBTAIN CURRENT YEAR-TO-DATE TAX DATA FOR THE USER OPERATION 205 from and/or through one or more computing system implemented data management systems such as computing system implemented data management systems 180 and/or 190 of FIG. 1. In one embodiment, the computing system implemented data management systems can be, but not limited to, computing system implemented tax preparation systems, computing system implemented personal financial management systems, computing system implemented payroll systems, computing system implemented healthcare systems, and/or any other computing system implemented data management systems, as discussed herein, and/or as known in the art at the time of filing, and/or as developed after the time of filing.

Returning to FIG. 2, in one embodiment, at least part of current year-to-date tax data for the user is obtained at OBTAIN CURRENT YEAR-TO-DATE TAX DATA FOR THE USER OPERATION 205 from a database such as databases 170, 171 and/or 172 of FIG. 1 and/or any of those discussed herein, and/or as known in the art at the time of filing, and/or as developed after the time of filing. Returning to FIG. 2, in one embodiment, at least part of current year-to-date tax data for the user is obtained at OBTAIN CURRENT YEAR-TO-DATE TAX DATA FOR THE USER OPERATION 205 via a network such as network 130 of FIG. 1 and/or any of those discussed herein, and/or as known in the art at the time of filing, and/or as developed after the time of filing. In one embodiment, at least part of current year-to-date tax data for the user is obtained at OBTAIN CURRENT YEAR-TO-DATE TAX DATA FOR THE USER OPERATION 205 from a computer program product such as those discussed herein, and/or as known in the art at the time of filing, and/or as developed after the time of filing.

In one embodiment, at least part of current year-to-date tax data for the user is obtained at OBTAIN CURRENT YEAR-TO-DATE TAX DATA FOR THE USER OPERATION 205 via any electronic data transfer and/or communication mechanism such as, but not limited to: networks of computing systems, as discussed herein, including public networks such as the Internet; cellular networks; websites; e-mail; electronic attachments to e-mail; text messages; cable television, satellite television, and/or "on demand" television networks and/or services; data embedded in digital media such as DVDs, CDs, and MP3 files; data displayed in on-line digital media sites; and/or any other electronic data transfer and/or communication mechanism as discussed herein, and/or known in the art at the time of filing, and/or as developed after the time of filing.

In one embodiment, at least part of current year-to-date tax data for the user is obtained at OBTAIN CURRENT YEAR-TO-DATE TAX DATA FOR THE USER OPERATION 205 from any combination of the above listed sources and/or from any other source of baseline tax data for the user, as discussed herein, and/or as known in the art at the time of filing, and/or as developed after the time of filing.

In one embodiment, at least part of the current year-to-date tax data for the user obtained at OBTAIN CURRENT YEAR-TO-DATE TAX DATA FOR THE USER OPERATION 205 is used to extrapolate/project the tax data for the entire current tax year. As discussed in more detail below, in one embodiment, at least part of the current year-to-date tax data, and/or extrapolated/projected tax data for the entire current tax year, for the user obtained at OBTAIN CURRENT YEAR-TO-DATE TAX DATA FOR THE USER OPERATION 205 is used to calculate and/or update an estimate and/or projection of tax liability for the current tax year by the user.

In one embodiment, once current year-to-date tax data for a user is obtained at OBTAIN CURRENT YEAR-TO-DATE TAX DATA FOR THE USER OPERATION 205, process flow proceeds to OBTAIN DATA REPRESENTING CURRENT YEAR DIRECTIVES, CHOICES, AND/OR EVENTS ASSOCIATED WITH THE USER THAT HAVE POTENTIAL TAX CONSEQUENCES OPERATION 207.

In one embodiment, at OBTAIN DATA REPRESENTING CURRENT YEAR DIRECTIVES, CHOICES, AND/OR EVENTS ASSOCIATED WITH THE USER THAT HAVE POTENTIAL TAX CONSEQUENCES OPERATION 207 data representing current tax year directives made by the user, and/or data representing tax related choices made by the user in the current tax year to date, and/or data representing tax related events associated with the user in the current tax year to date is obtained.

In one embodiment, current tax year directives made by the user include, but are not limited to: tax exemptions declared by the user for the current tax year; any changes in the withholdings made by the user for the current tax year; any changes in the allocation of funds to eligible retirement plans, such as IRAs, 401K, etc., made by the user for the current tax year, or any other directives made by the user for the current tax year that potentially affect the user's tax withholdings and/or year-end tax liability.

In addition, in one embodiment, at OBTAIN DATA REPRESENTING CURRENT YEAR DIRECTIVES, CHOICES, AND/OR EVENTS ASSOCIATED WITH THE USER THAT HAVE POTENTIAL TAX CONSEQUENCES OPERATION 207 the user provides hypothetical current tax year directive data and then uses process for providing a year-round tax monitor 200 to show the tax ramifications of the hypothetical current tax year directives before making actual decisions.

In one embodiment, tax related choices made by the user in the current tax year include, but are not limited to: choices made by the user to buy or sell assets such as stock, bonds, real estate, etc.; healthcare program choices such as participation in various employer and/or government sponsored/supported healthcare insurance/expense programs; choices regarding the use/withdraw of retirement funds from various sources such as an IRA, 401K, etc.; the choice of retirement itself for either the user or the user's spouse; and/or any other choices made by the user in the current tax year that have potential tax consequences.

In addition, in one embodiment, at OBTAIN DATA REPRESENTING CURRENT YEAR DIRECTIVES, CHOICES, AND/OR EVENTS ASSOCIATED WITH THE USER THAT HAVE POTENTIAL TAX CONSEQUENCES OPERATION 207 the user provides hypothetical tax related choices in the current tax year and then use process for providing a year-round tax monitor 200 to show the tax ramifications of the hypothetical tax related choices before the choices are actually made.

In one embodiment, tax related events associated with the user for the current tax year to date include, but are not limited to: the user moving to a new location; the user marrying or divorcing; the user having a child; the user suffering significant illness and/or disability; a job change; a raise or a new pay structure; retirement and/or change in employment status of a spouse; or any other event occurring in the current tax year that potentially has tax ramifications.

In addition, in one embodiment, OBTAIN DATA REPRESENTING CURRENT YEAR DIRECTIVES, CHOICES, AND/OR EVENTS ASSOCIATED WITH THE USER THAT HAVE POTENTIAL TAX CONSEQUENCES OPERATION 207 the user provides hypothetical tax related events and then uses process for providing a year-round tax monitor 200 to show the tax ramifications of the hypothetical tax related events before the events take place.

In one embodiment, at least part of the data representing current tax year directives made by the user, and/or the data representing tax related choices made by the user in the current tax year, and/or the data representing tax related events associated with the user for the current tax year is obtained at OBTAIN DATA REPRESENTING CURRENT YEAR DIRECTIVES, CHOICES, AND/OR EVENTS ASSOCIATED WITH THE USER THAT HAVE POTENTIAL TAX CONSEQUENCES OPERATION 207 from the user via manual input by the user, and/or an agent for the user, using a user interface screen on a display device, such as display devices 115, 165, and/or 125 of FIG. 1, and/or a user interface device, such as, but not limited to, a keyboard such as keyboards 107 and/or 111, a mouse, such as mice 111 and/or 161 of FIG. 1, a voice recognition system, a touch screen, a touch pad, or any other device and/or mechanism capable of providing user input to a computing system, such as computing system s 100 and/or 150 of FIG. 1, or for translating user actions into computing system operations, as discussed herein, and/or known in the art at the time of filing, and/or as developed after the time of filing.

Returning to FIG. 2, in one embodiment, at least part of the data representing current tax year directives made by the user, and/or the data representing tax related choices made by the user in the current tax year, and/or the data representing tax related events associated with the user for the current tax year is obtained at OBTAIN DATA REPRESENTING CURRENT YEAR DIRECTIVES, CHOICES, AND/OR EVENTS ASSOCIATED WITH THE USER THAT HAVE POTENTIAL TAX CONSEQUENCES OPERATION 207 from and/or through one or more computing system implemented data management systems such as computing system implemented data management systems 180 and/or 190 of FIG. 1. In one embodiment, the computing system implemented data management systems can be, but not limited to, computing system implemented tax preparation systems, computing system implemented personal financial management systems, computing system implemented payroll systems, computing system implemented healthcare systems, and/or any other computing system implemented data management systems, as discussed herein, and/or as known in the art at the time of filing, and/or as developed after the time of filing.

Returning to FIG. 2, in one embodiment, at least part of the data representing current tax year directives made by the user, and/or the data representing tax related choices made by the user in the current tax year, and/or the data representing tax related events associated with the user for the current tax year is obtained at OBTAIN DATA REPRESENTING CURRENT YEAR DIRECTIVES, CHOICES, AND/OR EVENTS ASSOCIATED WITH THE USER THAT HAVE POTENTIAL TAX CONSEQUENCES OPERATION 207 from a database such as databases 170, 171 and/or 172 of FIG. 1 and/or any of those discussed herein, and/or as known in the art at the time of filing, and/or as developed after the time of filing. Returning to FIG. 2, in one embodiment, at least part of the data representing current tax year directives made by the user, and/or the data representing tax related choices made by the user in the current tax year, and/or the data representing tax related events associated with the user for the current tax year is obtained at OBTAIN DATA REPRESENTING CURRENT YEAR DIRECTIVES, CHOICES, AND/OR EVENTS ASSOCIATED WITH THE USER THAT HAVE POTENTIAL TAX CONSEQUENCES OPERATION 207 via a network such as network 130 of FIG. 1 and/or any of those discussed herein, and/or as known in the art at the time of filing, and/or as developed after the time of filing. In one embodiment, at least part of the data representing current tax year directives made by the user, and/or the data representing tax related choices made by the user in the current tax year, and/or the data representing tax related events associated with the user for the current tax year is obtained at OBTAIN DATA REPRESENTING CURRENT YEAR DIRECTIVES, CHOICES, AND/OR EVENTS ASSOCIATED WITH THE USER THAT HAVE POTENTIAL TAX CONSEQUENCES OPERATION 207 from a computer program product such as those discussed herein, and/or as known in the art at the time of filing, and/or as developed after the time of filing.

In one embodiment, at least part of the data representing current tax year directives made by the user, and/or the data representing tax related choices made by the user in the current tax year, and/or the data representing tax related events associated with the user for the current tax year is obtained at OBTAIN DATA REPRESENTING CURRENT YEAR DIRECTIVES, CHOICES, AND/OR EVENTS ASSOCIATED WITH THE USER THAT HAVE POTENTIAL TAX CONSEQUENCES OPERATION 207 via any electronic data transfer and/or communication mechanism such as, but not limited to: networks of computing systems, as discussed herein, including public networks such as the Internet; cellular networks; websites; e-mail; electronic attachments to e-mail; text messages; cable television, satellite television, and/or "on demand" television networks and/or services; data embedded in digital media such as DVDs, CDs, and MP3 files; data displayed in on-line digital media sites; and/or any other electronic data transfer and/or communication mechanism as discussed herein, and/or known in the art at the time of filing, and/or as developed after the time of filing.

In one embodiment, at least part of the data representing current tax year directives made by the user, and/or the data representing tax related choices made by the user in the current tax year, and/or the data representing tax related events associated with the user for the current tax year is obtained at OBTAIN DATA REPRESENTING CURRENT YEAR DIRECTIVES, CHOICES, AND/OR EVENTS ASSOCIATED WITH THE USER THAT HAVE POTENTIAL TAX CONSEQUENCES OPERATION 207 from any combination of the above listed sources and/or from any other source of data for the user, as discussed herein, and/or as known in the art at the time of filing, and/or as developed after the time of filing.

In one embodiment, once the data representing current tax year directives made by the user, and/or the data representing tax related choices made by the user in the current tax year, and/or the data representing tax related events associated with the user for the current tax year is obtained at OBTAIN DATA REPRESENTING CURRENT YEAR DIRECTIVES, CHOICES, AND/OR EVENTS ASSOCIATED WITH THE USER THAT HAVE POTENTIAL TAX CONSEQUENCES OPERATION 207, process flow proceeds to ESTIMATE AND/OR PROJECT CURRENT YEAR TAX LIABILITY OPERATION 209.

In one embodiment at ESTIMATE AND/OR PROJECT CURRENT YEAR TAX LIABILITY OPERATION 209 using the baseline tax data of OBTAIN BASELINE TAX DATA FOR A USER OPERATION 203, and/or current year-to-date tax data of OBTAIN CURRENT YEAR-TO-DATE TAX DATA FOR THE USER OPERATION 205, and/or the data representing current tax year directives made by the user, and/or the data representing tax related choices made by the user in the current tax year, and/or the data representing tax related events associated with the user for the current tax year of OBTAIN DATA REPRESENTING CURRENT YEAR DIRECTIVES, CHOICES, AND/OR EVENTS ASSOCIATED WITH THE USER THAT HAVE POTENTIAL TAX CONSEQUENCES OPERATION 207, an estimate and/or projection of tax liability for the current tax year is calculated and/or updated as needed.

In one embodiment, at ESTIMATE AND/OR PROJECT CURRENT YEAR TAX LIABILITY OPERATION 209, using the baseline tax data, and/or current year-to-date tax data, and/or the data representing current tax year directives made by the user, and/or the data representing tax related choices made by the user in the current tax year, and/or the data representing tax related events associated with the user for the current tax year, an estimate and/or projection of tax liability for the current tax year is calculated, at least in part, using a tax rules engine and/or database.

In one embodiment, the tax rules engine and/or database used at ESTIMATE AND/OR PROJECT CURRENT YEAR TAX LIABILITY OPERATION 209 is a pre-existing tax rules engine and/or database created by and/or associated with one or more computing system implemented data management systems, such as a computing system implemented tax management and/or preparation system.

Many computing system implemented data management systems, and, in particular, many computing system implemented tax management and/or preparation systems include, and/or have access to, tax rules engines and/or databases that contain tax rules and data for various regions and for various situations. For instance, some computing system implemented data management systems, such as computing system implemented tax management and/or preparation systems and computing system implemented payroll management systems, currently include and/or have access to data representing all of the tax rules for all parts of the United States. In addition, some of these computing system implemented data management systems also include and/or have access to the payroll tax rules as well. In one embodiment, at ESTIMATE AND/OR PROJECT CURRENT YEAR TAX LIABILITY OPERATION 209 process for providing a year-round tax monitor 200 is provided access to this data by and/or through one or more of these computing system implemented data management systems that are a parent system for, and/or are otherwise associated with, process for providing a year-round tax monitor 200.

In one embodiment, process for providing a year-round tax monitor 200 is provided access to one or more tax rules engines and/or databases at ESTIMATE AND/OR PROJECT CURRENT YEAR TAX LIABILITY OPERATION 209 via a network, such as those discussed herein, and/or known in the art a the time of filing, and/or as developed after the time of filing.

In one embodiment, process for providing a year-round tax monitor 200 is provided access to one or more tax rules engines and/or databases at ESTIMATE AND/OR PROJECT CURRENT YEAR TAX LIABILITY OPERATION 209 by accessing a database, such as those discussed herein, and/or known in the art at the time of filing, and/or as developed after the time of filing.

In one embodiment, process for providing a year-round tax monitor 200 is provided access to one or more tax rules engines and/or databases at ESTIMATE AND/OR PROJECT CURRENT YEAR TAX LIABILITY OPERATION 209 via a computer program product, such as those discussed herein, and/or known in the art at the time of filing, and/or as developed after the time of filing.

In one embodiment, process for providing a year-round tax monitor 200 is provided access to one or more tax rules engines and/or databases at ESTIMATE AND/OR PROJECT CURRENT YEAR TAX LIABILITY OPERATION 209 via a website and/or using screen scrapping technology or a similar technology, such as those discussed herein, and/or known in the art at the time of filing, and/or as developed after the time of filing.

In one embodiment, process for providing a year-round tax monitor 200 is provided access to one or more tax rules engines and/or databases at ESTIMATE AND/OR PROJECT CURRENT YEAR TAX LIABILITY OPERATION 209 by any mechanism for data transfer and/or display such as those discussed herein, and/or known in the art a the time of filing, and/or as developed after the time of filing.

In one embodiment, the baseline tax data, and/or current year-to-date tax data, and/or the data representing current tax year directives made by the user, and/or the data representing tax related choices made by the user in the current tax year, and/or the data representing tax related events associated with the user for the current tax year, is provided to the tax rules engine and/or database by any of the data transfer mechanisms discussed herein, and/or known in the art at the time of filing, and/or as developed after the time of filing. In one embodiment, at ESTIMATE AND/OR PROJECT CURRENT YEAR TAX LIABILITY OPERATION 209 and the tax rules engine and/or database processes the data and provides an estimate and/or projection of tax liability for the current tax year.

In one embodiment, using the baseline tax data of OBTAIN BASELINE TAX DATA FOR A USER OPERATION 203, and current year-to-date tax data of OBTAIN CURRENT YEAR-TO-DATE TAX DATA FOR THE USER OPERATION 205, an estimate and/or projection of tax liability for the current tax year is calculated at ESTIMATE AND/OR PROJECT CURRENT YEAR TAX LIABILITY OPERATION 209 based on analysis of any changes between baseline tax data and the current year-to-date tax data, and/or extrapolated/projected current year tax data, and/or changes in the data representing current tax year directives made by the user, and/or the data representing tax related choices made by the user in the current tax year, and/or the data representing tax related events associated with the user for the current tax year, and/or any changes in the applicable tax laws between the baseline tax data year and the current tax year.

In one embodiment, using the baseline tax data, and/or current year-to-date tax data, and/or the data representing current tax year directives made by the user, and/or the data representing tax related choices made by the user in the current tax year, and/or the data representing tax related events associated with the user for the current tax year, an estimate and/or projection of tax liability for the current tax year is calculated at ESTIMATE AND/OR PROJECT CURRENT YEAR TAX LIABILITY OPERATION 209 using any method, means and/or mechanism for calculating an estimate and/or projection of the tax liability for a given tax year, as discussed herein, and/or as known in the art at the time of filing, and/or as developed after the time of filing.

In one embodiment, once using the baseline tax data of OBTAIN BASELINE TAX DATA FOR A USER OPERATION 203, and/or current year-to-date tax data of OBTAIN CURRENT YEAR-TO-DATE TAX DATA FOR THE USER OPERATION 205, and/or the data representing current tax year directives made by the user, and/or the data representing tax related choices made by the user in the current tax year, and/or the data representing tax related events associated with the user for the current tax year of OBTAIN DATA REPRESENTING CURRENT YEAR DIRECTIVES, CHOICES, AND/OR EVENTS ASSOCIATED WITH THE USER THAT HAVE POTENTIAL TAX CONSEQUENCES OPERATION 207, an estimate and/or projection of tax liability for the current tax year is calculated and/or updated as needed at ESTIMATE AND/OR PROJECT CURRENT YEAR TAX LIABILITY OPERATION 209, process flow proceeds to USING THE DATA INDICATING THE ESTIMATED AND/OR PROJECTED CURRENT YEAR TAX LIABILITY, CALCULATE AN ESTIMATED TAX REFUND, OR TAX LIABILITY, FOR THE CURRENT YEAR FOR THE USER OPERATION 211.

In one embodiment, at USING THE DATA INDICATING THE ESTIMATED AND/OR PROJECTED CURRENT YEAR TAX LIABILITY, CALCULATE AN ESTIMATED TAX REFUND, OR TAX LIABILITY, FOR THE CURRENT YEAR FOR THE USER OPERATION 211 the estimate and/or projection of tax liability for the current tax year of ESTIMATE AND/OR PROJECT CURRENT YEAR TAX LIABILITY OPERATION 209 is used to estimate a projected tax refund that will be owed to, or a tax liability that will owed by, the user for the current tax year.

In one embodiment, at USING THE DATA INDICATING THE ESTIMATED AND/OR PROJECTED CURRENT YEAR TAX LIABILITY, CALCULATE AN ESTIMATED TAX REFUND, OR TAX LIABILITY, FOR THE CURRENT YEAR FOR THE USER OPERATION 211 the estimate and/or projection of tax liability for the current tax year of ESTIMATE AND/OR PROJECT CURRENT YEAR TAX LIABILITY OPERATION 209 is used to estimate a projected tax refund that will be owed to, or a tax liability that will owed by, the user for the current tax year by comparing the estimate and/or projection of tax liability for the current tax year ESTIMATE AND/OR PROJECT CURRENT YEAR TAX LIABILITY OPERATION 209 and the actual and/or projected tax withholdings, and/or taxes prepaid, and/or tax credits associated with, the user for the current tax year as obtained from the current year-to-date tax data of OBTAIN CURRENT YEAR-TO-DATE TAX DATA FOR THE USER OPERATION 205 and/or the baseline tax data of OBTAIN BASELINE TAX DATA FOR A USER OPERATION 203.

In one embodiment, if the estimate and/or projection of tax liability for the current tax year of ESTIMATE AND/OR PROJECT CURRENT YEAR TAX LIABILITY OPERATION 209 is less than the actual and/or projected tax withholdings, and/or taxes prepaid, and/or tax credits associated with, the user for the current tax year as obtained from the current year-to-date tax data of OBTAIN CURRENT YEAR-TO-DATE TAX DATA FOR THE USER OPERATION 205 and/or the baseline tax data of OBTAIN BASELINE TAX DATA FOR A USER OPERATION 203, then at USING THE DATA INDICATING THE ESTIMATED AND/OR PROJECTED CURRENT YEAR TAX LIABILITY, CALCULATE AN ESTIMATED TAX REFUND, OR TAX LIABILITY, FOR THE CURRENT YEAR FOR THE USER OPERATION 211 an estimated tax refund that will be owed to the user is determined.

On the other hand, if the estimate and/or projection of tax liability for the current tax year of ESTIMATE AND/OR PROJECT CURRENT YEAR TAX LIABILITY OPERATION 209 is greater than the actual and/or projected tax withholdings, and/or taxes prepaid, and/or tax credits associated with, the user for the current tax year as obtained from the current year-to-date tax data of OBTAIN CURRENT YEAR-TO-DATE TAX DATA FOR THE USER OPERATION 205 and/or the baseline tax data of OBTAIN BASELINE TAX DATA FOR A USER OPERATION 203, then at USING THE DATA INDICATING THE ESTIMATED AND/OR PROJECTED CURRENT YEAR TAX LIABILITY, CALCULATE AN ESTIMATED TAX REFUND, OR TAX LIABILITY, FOR THE CURRENT YEAR FOR THE USER OPERATION 211 an estimated tax that will be owed by the user is determined.

In one embodiment, once the estimate and/or projection of tax liability for the current tax year of ESTIMATE AND/OR PROJECT CURRENT YEAR TAX LIABILITY OPERATION 209 is used to estimate a projected tax refund that will be owed to, or a tax liability that will owed by, the user for the current tax year at USING THE DATA INDICATING THE ESTIMATED AND/OR PROJECTED CURRENT YEAR TAX LIABILITY, CALCULATE AN ESTIMATED TAX REFUND, OR TAX LIABILITY, FOR THE CURRENT YEAR FOR THE USER OPERATION 211, process flow proceeds to PROVIDE DATA INDICATING THE ESTIMATED TAX REFUND, OR TAX LIABILITY, FOR THE CURRENT YEAR TO THE USER ON A DISPLAY DEVICE OF A COMPUTING SYSTEM OPERATION 213.

In one embodiment, at PROVIDE DATA INDICATING THE ESTIMATED TAX REFUND, OR TAX LIABILITY, FOR THE CURRENT YEAR TO THE USER ON A DISPLAY DEVICE OF A COMPUTING SYSTEM OPERATION 213 data indicating the estimated and/or projected tax refund that will be owed to, or tax that will owed by, the user for the current tax year USING THE DATA INDICATING THE ESTIMATED AND/OR PROJECTED CURRENT YEAR TAX LIABILITY, CALCULATE AN ESTIMATED TAX REFUND, OR TAX LIABILITY, FOR THE CURRENT YEAR FOR THE USER OPERATION 211 is provided to the user.

In one embodiment, at PROVIDE DATA INDICATING THE ESTIMATED TAX REFUND, OR TAX LIABILITY, FOR THE CURRENT YEAR TO THE USER ON A DISPLAY DEVICE OF A COMPUTING SYSTEM OPERATION 213 the data indicating the estimated and/or projected tax refund that will be owed to, or tax that will owed by, the user for the current tax year is provided to the user via a tax monitor widget displayed on a display device, such as display devices 115, 165, 125 of FIG. 1 on any computing system, such as computing systems 100 and 150 and server system 120 of FIG. 1, accessible by the user, and/or on any of those discussed herein, and/or as known in the art at the time of filing, and/or as developed after the time of filing.

The terms "widget" or "desktop widget" are conventionally used to denote a desktop-based mini-application that displays discrete information, often connected to the Internet. Some desktop widgets have blurred the conventional line between the web/Internet and the desktop or mobile computing system by pulling the content out of the browser and integrating it into a desktop or mobile computing system, and/or or vise-versa. A relatively recent addition to the widget family is mobile widgets. Most mobile widgets are like desktop widgets, but for a mobile phone or other mobile computing system. Mobile widgets can maximize screen space use and may be especially useful in placing live data-rich applications on the device home-screen/"phone-top".

Widgets are typically interactive virtual tools that provide single-purpose services. However, more recently, "website support widgets" have been developed that provide a user guidance and/or support for specific supported websites. Typically, these website support widgets support, and/or provide functionality and tools, and/or provide a data gathering/help interface, for one or more specific websites associated with a common topic and/or service.

As used herein, the terms "widget" or "desktop widget" are used interchangeably and include, but are not limited to, a desktop-based, or any computing system-based mini-application that displays discrete information. As used herein, the terms "widget" or "desktop widget" also includes, but is not limited to, mobile widgets. As used herein, the terms "widget" or "desktop widget" also includes, but is not limited to "website support widgets".

In one embodiment, at PROVIDE DATA INDICATING THE ESTIMATED TAX REFUND, OR TAX LIABILITY, FOR THE CURRENT YEAR TO THE USER ON A DISPLAY DEVICE OF A COMPUTING SYSTEM OPERATION 213 the data indicating the estimated and/or projected tax refund that will be owed to, or tax that will owed by, the user for the current tax year is provided to the user via a tax monitor widget that is a website support widget that is displayed on a display device when a user is viewing s supported website. In some embodiments, supported websites can include, but are not limited to: websites associated with financial institutions such as banks, brokers, mortgage holders, asset managers, etc.; websites associated with computing system implemented data management systems, such as computing system implemented tax management and/or preparation systems, computing system implemented financial management systems, computing system implemented payroll management systems computing system implemented healthcare management systems, computing system implemented retirement management systems, etc.; websites associated with payroll; websites associated with retirement and/or retirement plans; websites associated with government; and/or any websites associated with any topic as desired.

In one embodiment, the estimated and/or projected tax refund that will be owed to, or a tax liability that will owed by, the user for the current tax year is displayed to the user via the tax monitor widget at PROVIDE DATA INDICATING THE ESTIMATED TAX REFUND, OR TAX LIABILITY, FOR THE CURRENT YEAR TO THE USER ON A DISPLAY DEVICE OF A COMPUTING SYSTEM OPERATION 213 continuously, and/or on demand, and/or at start up, and/or at defined intervals.

In one embodiment, the estimated and/or projected tax refund that will be owed to, or a tax liability that will owed by, the user for the current tax year displayed to the user via the tax monitor widget at PROVIDE DATA INDICATING THE ESTIMATED TAX REFUND, OR TAX LIABILITY, FOR THE CURRENT YEAR TO THE USER ON A DISPLAY DEVICE OF A COMPUTING SYSTEM OPERATION 213 is updated upon user demand. In one embodiment, the user demand is made via manual input by the user, and/or an agent for the user, using a user interface screen and/or a user interface device such as, but not limited to, a keyboard, mouse, voice recognition system, touch screen, touch pad, or any other device and/or mechanism capable of providing user input to a computing system, or for translating user actions into computing system operations, as discussed herein, and/or known in the art at the time of filing, and/or as developed after the time of filing.

In one embodiment, the estimated tax refund that will be owed to, or a tax liability that will owed by, the user for the current tax year displayed to the user via the tax monitor widget at PROVIDE DATA INDICATING THE ESTIMATED TAX REFUND, OR TAX LIABILITY, FOR THE CURRENT YEAR TO THE USER ON A DISPLAY DEVICE OF A COMPUTING SYSTEM OPERATION 213 is updated periodically and/or automatically at regular intervals.

In one embodiment, the estimated tax refund that will be owed to, or a tax liability that will owed by, the user for the current tax year displayed to the user at PROVIDE DATA INDICATING THE ESTIMATED TAX REFUND, OR TAX LIABILITY, FOR THE CURRENT YEAR TO THE USER ON A DISPLAY DEVICE OF A COMPUTING SYSTEM OPERATION 213 via the tax monitor widget is updated when the underlying baseline tax data of OBTAIN BASELINE TAX DATA FOR A USER OPERATION 203, and/or current year-to-date tax data of OBTAIN CURRENT YEAR-TO-DATE TAX DATA FOR THE USER OPERATION 205, and/or the data representing current tax year directives made by the user, and/or the data representing tax related choices made by the user in the current tax year, and/or the data representing tax related events associated with the user for the current tax year of OBTAIN DATA REPRESENTING CURRENT YEAR DIRECTIVES, CHOICES, AND/OR EVENTS ASSOCIATED WITH THE USER THAT HAVE POTENTIAL TAX CONSEQUENCES OPERATION 207 changes and/or the applicable tax laws change.

In addition, in one embodiment, as noted above, the user can provide hypothetical baseline tax data, and/or hypothetical current year-to-date tax data, and/or hypothetical data representing current tax year directives made by the user, and/or hypothetical data representing tax related choices made by the user in the current tax year, and/or hypothetical data representing tax related events associated with the user for the current tax year, and/or hypothetical changes thereto, and then use process for providing a year-round tax monitor 200 to show the estimated tax refund that will be owed to, or a tax liability that will owed by, the user for the current tax year under the hypothetical conditions at PROVIDE DATA INDICATING THE ESTIMATED TAX REFUND, OR TAX LIABILITY, FOR THE CURRENT YEAR TO THE USER ON A DISPLAY DEVICE OF A COMPUTING SYSTEM OPERATION 213.

In one embodiment, once data indicating the estimated and/or projected tax refund that will be owed to, or tax that will owed by, the user for the current tax year of USING THE DATA INDICATING THE ESTIMATED AND/OR PROJECTED CURRENT YEAR TAX LIABILITY, CALCULATE AN ESTIMATED TAX REFUND, OR TAX LIABILITY, FOR THE CURRENT YEAR FOR THE USER OPERATION 211 is provided to the user at PROVIDE DATA INDICATING THE ESTIMATED TAX REFUND, OR TAX LIABILITY, FOR THE CURRENT YEAR TO THE USER ON A DISPLAY DEVICE OF A COMPUTING SYSTEM OPERATION 213, process flow proceeds to EXIT OPERATION 230 and process for providing a year-round tax monitor 200 is exited to await new data and/or updates.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Figure 3:
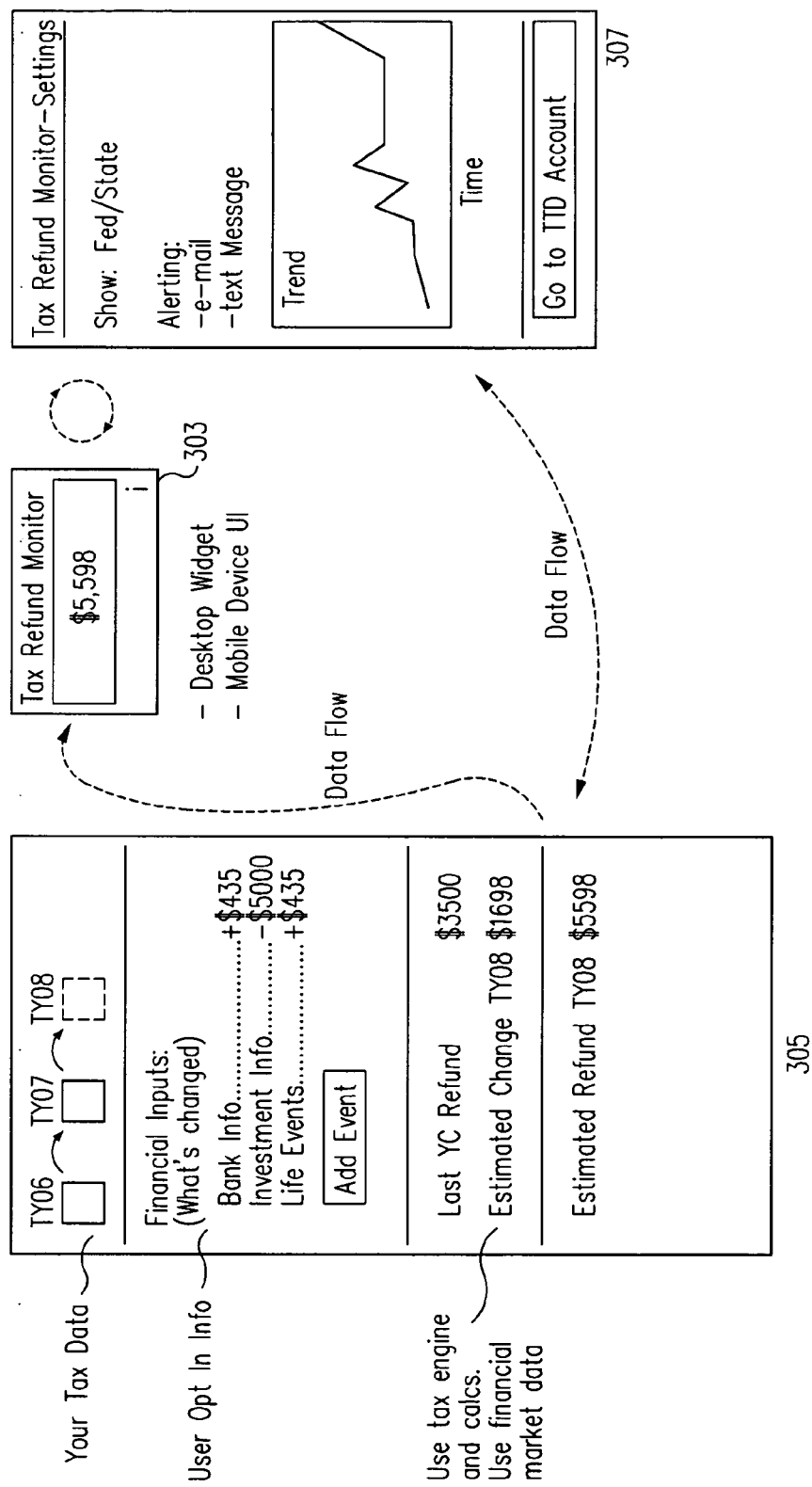
FIG. 3 shows a tax monitor widget, a home base display screen, and a user interface screen associated with one embodiment a process for providing a year-round tax monitor.

FIG. 3 shows a tax monitor widget 303 that, in this specific example of one embodiment, is used to provide data indicating the estimated and/or projected tax refund that will be owed to, or tax that will owed by, the user for the current tax year at PROVIDE DATA INDICATING THE ESTIMATED TAX REFUND, OR TAX LIABILITY, FOR THE CURRENT YEAR TO THE USER ON A DISPLAY DEVICE OF A COMPUTING SYSTEM OPERATION 213 (FIG. 2). Also shown in FIG. 3 are home base display 305 and setting interface display 307.

In one embodiment, tax monitor widget 303 is displayed on any display device, such as display devices 115, 165 and/or 125 of any computing system such as computing systems 100, 150 and server system 120 (FIG. 1). Returning to FIG. 3, in one embodiment, tax monitor widget 303 is displayed on any display device of any mobile system such as, but not limited to, a laptop computing system, a palmtop computing system, a PDA, a cellular phone, an Internet appliance, or any other computing system as discussed herein, known in the art at the time of filing, and/or as developed after the time of filing.

As noted above, in one embodiment, tax monitor widget 303 is displayed continuously, and/or on demand, and/or at start up, and/or at defined intervals, and/or in connection with the viewing of supported websites. As also noted above, in one embodiment, tax monitor widget 303 is updated when the underlying baseline tax data of OBTAIN BASELINE TAX DATA FOR A USER OPERATION 203 (FIG. 2), and/or current year-to-date tax data of OBTAIN CURRENT YEAR-TO-DATE TAX DATA FOR THE USER OPERATION 205, and/or the data representing current tax year directives made by the user, and/or the data representing tax related choices made by the user in the current tax year, and/or the data representing tax related events associated with the user for the current tax year of OBTAIN DATA REPRESENTING CURRENT YEAR DIRECTIVES, CHOICES, AND/OR EVENTS ASSOCIATED WITH THE USER THAT HAVE POTENTIAL TAX CONSEQUENCES OPERATION 207 changes and/or the applicable tax laws change.

Returning to FIG. 3, in one embodiment, home base display 305 is displayed on any display device, such as display devices 115, 165 and/or 125 of any computing system such as computing systems 100, 150 and server system 120 (FIG. 1). In one embodiment, home base display 305 shows more detail regarding the data indicating the estimated and/or projected tax refund that will be owed to, or tax that will owed by, the user for the current tax year at PROVIDE DATA INDICATING THE ESTIMATED TAX REFUND, OR TAX LIABILITY, FOR THE CURRENT YEAR TO THE USER ON A DISPLAY DEVICE OF A COMPUTING SYSTEM OPERATION 213 (FIG. 2). In addition, In one embodiment, home base display 305 (FIG. 3) interacts directly with setting interface display 307.

In one embodiment, setting interface display 307 is a user interface display whereby the user can make select various settings for process for providing a year-round tax monitor 200 using a user interface device such as, but not limited to, a keyboard, mouse, voice recognition system, touch screen, touch pad, or any other device and/or mechanism capable of providing user input to a computing system, or for translating user actions into computing system operations, as discussed herein, and/or known in the art at the time of filing, and/or as developed after the time of filing. In addition, in one embodiment, through setting interface display 307, a user can input various hypothetical data such as, hypothetical baseline tax data, and/or hypothetical current year-to-date tax data, and/or hypothetical data representing current tax year directives made by the user, and/or hypothetical data representing tax related choices made by the user in the current tax year, and/or hypothetical data representing tax related events associated with the user for the current tax year, and/or hypothetical changes thereto, and then use process for providing a year-round tax monitor 200 to show the estimated tax refund that will be owed to, or a tax liability that will owed by, the user for the current tax year under the hypothetical conditions.

Those of skill in the art will recognize that the displays shown in FIG. 3 are illustrative only and that, in other embodiments, different data, data formatting, data displays, and/or interfaces can be used. Consequently, the particular data, data formatting, data displays, and/or interfaces shown in FIG. 3 do not limit the scope as set forth in the claims below.

Using process for providing a year-round tax monitor 200, taxpayers are provided the ability to easily, and affordably, monitor their tax liabilities over the course of the entire year and/or under hypothetical conditions. Consequently, using process for providing a year-round tax monitor 200, a taxpayer can obtain tax information and make better informed financial decisions throughout the year, and/or obtain significant control over their tax liabilities. In addition, using process for providing a year-round tax monitor 200, there is less likelihood of the taxpayer making incorrect assumptions regarding their tax liabilities and/or refunds. Consequently, using process for providing a year-round tax monitor 200, both the taxpayers and the taxing authorities are benefited.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "determining", "analyzing", "obtaining", "identifying", "collecting", "transferring", "storing", "searching", "comparing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus, means, or system for performing the operations described herein. This apparatus, means, or system may be specifically constructed for the required purposes, or the apparatus, means, or system can comprise a general purpose system selectively activated or configured/reconfigured by a computer program stored via a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of networks, are defined herein, operating over numerous topologies.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. are identified using a particular nomenclature for ease of description and understanding, but other nomenclature is often used in the art to identify equivalent operations.

In the discussion above, certain aspects of various embodiments include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Therefore, numerous variations, whether explicitly provided for by the specification or implied by the specification or not, may be implemented by one of skill in the art in view of this disclosure.

What is claimed is:

1. A computing system implemented process for providing a year-round tax monitor comprising:

obtaining baseline tax data associated with a user;

obtaining current year-to-date tax data associated with the user;

obtaining supplementary user tax data for the current tax year associated with the user;

automatically analyzing, by a computing system, the baseline tax data associated with the user, the current year-to-date tax data associated with the user, and the supplementary user tax data for the current tax year associated with the user no less frequently than a change being automatically detected by a computing system in one or more of the baseline tax data, the current year-to-date tax data, or supplementary user tax data for the current tax year;

as a result of the analysis of the baseline tax data associated with the user, the current year-to-date tax data associated with the user, and the supplementary user tax data for the current tax year associated with the user, automatically estimating by a computing system, the user's current year tax liability;

automatically analyzing, by a computing system, the estimate of the user's current year tax liability, the current year-to-date tax data associated with the user, and the supplementary user tax data for the current tax year associated with the user;

as a result of the analysis of the estimate of the user's current year tax liability, the current year-to-date tax data associated with the user, and the supplementary user tax data for the current tax year associated with the user, automatically calculating, by a computing system, an estimated tax refund owed to, or a tax liability owed by, the user for the current tax year; and responsive to automatically calculating an estimated tax refund owed to, or a tax liability owed by, the user for the current tax year, automatically providing, by a computing system, data representing the calculated estimated tax refund owed to, or a tax liability owed by, the user for the current tax year to the user using a tax monitor widget displayed on a display device of a computing system.

2. The computing system implemented process for providing a year-round tax monitor of claim 1, wherein;
at least part of the baseline tax data associated with the user includes tax and/or filing data for the user from previous tax years.

3. The computing system implemented process for providing a year-round tax monitor of claim 1, wherein;
at least part of the baseline tax data associated with the user is obtained from a computing system implemented data management system.

4. The computing system implemented process for providing a year-round tax monitor of claim 1, wherein;
at least part of the baseline tax data associated with the user is obtained from a computing system implemented tax management system.

5. The computing system implemented process for providing a year-round tax monitor of claim 1, wherein;
at least part of the baseline tax data associated with the user is obtained from a computing system implemented personal financial management system.

6. The computing system implemented process for providing a year-round tax monitor of claim 1, wherein;
at least part of the current year-to-date tax data associated with the user includes one or more types of current year-to-date tax data selected from the group of types of current year-to-date tax data consisting of:
the user's actual income in the current tax year-to-date from all sources;
the user's projected income in the current tax year-to-date from all sources;
the user's deductible actual expenses incurred in the current tax year-to-date; and
the user's deductible projected expenses incurred in the current tax year-to-date.

7. The computing system implemented process for providing a year-round tax monitor of claim 1, wherein;
at least part of the current year-to-date tax data associated with the user is obtained from a computing system implemented data management system.

8. The computing system implemented process for providing a year-round tax monitor of claim 1, wherein;

at least part of the current year-to-date tax data associated with the user is obtained from a computing system implemented tax management system.

9. The computing system implemented process for providing a year-round tax monitor of claim 1, wherein;
at least part of the current year-to-date tax data associated with the user is obtained from a computing system implemented personal financial management system.

10. The computing system implemented process for providing a year-round tax monitor of claim 1, wherein;
at least part of the current year-to-date tax data associated with the user is obtained from a computing system implemented payroll management system.

11. The computing system implemented process for providing a year-round tax monitor of claim 1, wherein;
at least part of the supplementary user tax data for the current tax year associated with the user includes one or more types of supplementary user tax data selected from the group of types of supplementary user tax data consisting of:
data representing current tax year directives made by the user;
data representing tax related choices made by the user in the current tax year; and
data representing tax related events associated with the user for the current tax year to date.

12. The computing system implemented process for providing a year-round tax monitor of claim 1, wherein;
at least part of the supplementary user tax data for the current tax year associated with the user is obtained from a computing system implemented data management system.

13. The computing system implemented process for providing a year-round tax monitor of claim 1, wherein;
at least part of the supplementary user tax data for the current tax year associated with the user is obtained from a computing system implemented tax management system.

14. The computing system implemented process for providing a year-round tax monitor of claim 1, wherein;
at least part of the supplementary user tax data for the current tax year associated with the user is obtained from a computing system implemented personal financial management system.

15. The computing system implemented process for providing a year-round tax monitor of claim 1, wherein;
at least part of the supplementary user tax data for the current tax year associated with the user is obtained from a computing system implemented payroll management system.

16. The computing system implemented process for providing a year-round tax monitor of claim 1, wherein;
automatically analyzing, using a computing system, the baseline tax data associated with the user, the current year-to-date tax data associated with the user, and the supplementary user tax data for the current tax year associated with the user is performed, at least in part, using a tax rules engine.

17. The computing system implemented process for providing a year-round tax monitor of claim 16, wherein;
the tax rules engine is associated with a computing system implemented data management system.

18. The computing system implemented process for providing a year-round tax monitor of claim 1, wherein;
automatically analyzing, using a computing system, the estimate of the user's current year tax liability, the current year-to-date tax data associated with the user, and the supplementary user tax data for the current tax year associated with the user, comprises projecting, using a computing system, current year tax data for the user for the entire current tax year based on the current year-to-date tax data associated with the user and the supplementary user tax data for the current tax year associated with the user, and then analyzing, using a computing system, the projected current year tax data for the user for the entire current tax year and the estimate of the user's current year tax liability.

19. The computing system implemented process for providing a year-round tax monitor of claim 1, wherein;
the tax monitor widget is displayed on the display device of the computing system upon user demand.

20. The computing system implemented process for providing a year-round tax monitor of claim 1, wherein;
the tax monitor widget is displayed on the display device of the computing system at defined intervals.

21. The computing system implemented process for providing a year-round tax monitor of claim 1, wherein;
the tax monitor widget is displayed on the display device of the computing system at defined events.

22. The computing system implemented process for providing a year-round tax monitor of claim 1, wherein;
the tax monitor widget is triggered to be displayed on the display device of a computing system whenever the baseline tax data associated with the user, or the current year-to-date tax data associated with the user, or the supplementary user tax data for the current tax year associated with the user, or the applicable tax, changes.

23. The computing system implemented process for providing a year-round tax monitor of claim 1, wherein;
the tax monitor widget is a website support widget that is displayed on the display device of a computing system when supported websites are viewed.

24. The computing system implemented process for providing a year-round tax monitor of claim 1, wherein;
the tax monitor widget is displayed on the display device of the computing system whenever the computing system is on.

25. The computing system implemented process for providing a year-round tax monitor of claim 1, wherein;
the tax monitor widget displayed on the display device of a computing system is updated upon user demand.

26. The computing system implemented process for providing a year-round tax monitor of claim 1, wherein;
the tax monitor widget displayed on the display device of a computing system is updated at defined intervals.

27. The computing system implemented process for providing a year-round tax monitor of claim 1, wherein;
the tax monitor widget displayed on the display device of a computing system is updated whenever the baseline tax data associated with the user, or the current year-to-date tax data associated with the user, or the supplementary user tax data for the current tax year associated with the user, or the applicable tax law, changes.

28. A computer program product for providing a process for providing a year-round tax monitor comprising:
a computer readable medium; and
computer program code, encoded on the computer readable medium, comprising computer readable instructions for:
obtaining baseline tax data associated with a user;
obtaining current year-to-date tax data associated with the user;
obtaining supplementary user tax data for the current tax year associated with the user;
automatically analyzing the baseline tax data associated with the user, the current year-to-date tax data associated with the user, and the supplementary user tax data for the current tax year associated with the user no less frequently than a change being automatically detected in one or more of the baseline tax data, the current year-to-date tax data, or supplementary user tax data for the current tax year;
as a result of the analysis of the baseline tax data associated with the user, the current year-to-date tax data associated with the user, and the supplementary user tax data for the current tax year associated with the user, automatically estimating the user's current year tax liability;
automatically analyzing the estimate of the user's current year tax liability, the current year-to-date tax data associated with the user, and the supplementary user tax data for the current tax year associated with the user;
as a result of the analysis of the estimate of the user's current year tax liability, the current year-to-date tax data associated with the user, and the supplementary user tax data for the current tax year associated with the user, automatically calculating an estimated tax refund owed to, or a tax liability owed by, the user for the current tax year; and
responsive to automatically calculating an estimated tax refund owed to, or a tax liability owed by, the user for the current tax year, providing data representing the calculated estimated tax refund owed to, or a tax liability owed by, the user for the current tax year to the user using a tax monitor widget displayed on a display device of a computing system.

29. The computer program product for providing a process for providing a year-round tax monitor of claim 28, wherein;
at least part of the baseline tax data associated with the user includes tax and/or filing data for the user from previous tax years.

30. The computer program product for providing a process for providing a year-round tax monitor of claim 28, wherein;
at least part of the baseline tax data associated with the user is obtained from a computing system implemented data management system.

31. The computer program product for providing a process for providing a year-round tax monitor of claim 28, wherein;
at least part of the current year-to-date tax data associated with the user includes one or more types of current year-to-date tax data selected from the group of types of current year-to-date tax data consisting of:
the user's actual income in the current tax year-to-date from all sources;
the user's projected income in the current tax year-to-date from all sources;
the user's deductible actual expenses incurred in the current tax year-to-date; and
the user's deductible projected expenses incurred in the current tax year-to-date.

32. The computer program product for providing a process for providing a year-round tax monitor of claim 28, wherein;
at least part of the current year-to-date tax data associated with the user is obtained from a computing system implemented data management system.

33. The computer program product for providing a process for providing a year-round tax monitor of claim 28, wherein;
at least part of the supplementary user tax data for the current tax year associated with the user includes one or more types of supplementary user tax data selected from the group of types of supplementary user tax data consisting of:

data representing current tax year directives made by the user;

data representing tax related choices made by the user in the current tax year; and data representing tax related events associated with the user for the current tax year to date.

34. The computer program product for providing a process for providing a year-round tax monitor of claim 28, wherein;

at least part of the supplementary user tax data for the current tax year associated with the user is obtained from a computing system implemented data management system.

35. The computer program product for providing a process for providing a year-round tax monitor of claim 28, wherein;

automatically analyzing the estimate of the user's current year tax liability, the current year-to-date tax data associated with the user, and the supplementary user tax data for the current tax year associated with the user, comprises automatically projecting current year tax data for the user for the entire current tax year based on the current year-to-date tax data associated with the user and the supplementary user tax data for the current tax year associated with the user, and then automatically analyzing the projected current year tax data for the user for the entire current tax year and the estimate of the user's current year tax liability.

36. The computer program product for providing a process for providing a year-round tax monitor of claim 28, wherein;

the tax monitor widget is triggered to be displayed on the display device of the computing system whenever the baseline tax data associated with the user, or the current year-to-date tax data associated with the user, or the supplementary user tax data for the current tax year associated with the user, or the applicable tax, changes.

37. The computer program product for providing a process for providing a year-round tax monitor of claim 28, wherein;

the tax monitor widget is a website support widget that is displayed on the display device of the computing system when supported websites are viewed.

38. The computer program product for providing a process for providing a year-round tax monitor of claim 28, wherein;

the tax monitor widget displayed on the display device of a computing system is updated whenever the baseline tax data associated with the user, or the current year-to-date tax data associated with the user, or the supplementary user tax data for the current tax year associated with the user, or the applicable tax law, changes.

39. A method for providing year-round tax monitoring comprising:

providing a first computing system;

providing a second computing system coupled to the first computing system;

obtaining baseline tax data associated with a user;

obtaining current year-to-date tax data associated with the user;

obtaining supplementary user tax data for the current tax year associated with the user;

automatically analyzing, by the first computing system, the baseline tax data associated with the user, the current year-to-date tax data associated with the user, and the supplementary user tax data for the current tax year associated with the user no less frequently than a change being automatically detected in one or more of the baseline tax data, the current year-to-date tax data, or supplementary user tax data for the current tax year;

as a result of the analysis of the baseline tax data associated with the user, the current year-to-date tax data associated with the user, and the supplementary user tax data for the current tax year associated with the user, automatically estimating, by the first computing system, the user's current year tax liability;

automatically analyzing, by the first computing system, the estimate of the user's current year tax liability, the current year-to-date tax data associated with the user, and the supplementary user tax data for the current tax year associated with the user;

as a result of the analysis of the estimate of the user's current year tax liability, the current year-to-date tax data associated with the user, and the supplementary user tax data for the current tax year associated with the user, automatically calculating, by the first computing system, an estimated tax refund owed to, or a tax liability owed by, the user for the current tax year; and automatically providing data representing the calculated estimated tax refund owed to, or a tax liability owed by, the user for the current tax year to the user using a tax monitor widget displayed on a display device of the second computing system.

40. The method for providing year-round tax monitoring of claim 39, wherein;

at least part of the baseline tax data associated with the user includes tax and/or filing data for the user from previous tax years.

41. The method for providing year-round tax monitoring of claim 39, wherein;

at least part of the baseline tax data associated with the user is obtained from a computing system implemented data management system.

42. The method for providing year-round tax monitoring of claim 39, wherein;

at least part of the current year-to-date tax data associated with the user includes one or more types of current year-to-date tax data selected from the group of types of current year-to-date tax data consisting of:

the user's actual income in the current tax year-to-date from all sources;

the user's projected income in the current tax year-to-date from all sources;

the user's deductible actual expenses incurred in the current tax year-to-date; and the user's deductible projected expenses incurred in the current tax year-to-date.

43. The method for providing year-round tax monitoring of claim 39, wherein;

at least part of the current year-to-date tax data associated with the user is obtained from a computing system implemented data management system.

44. The method for providing year-round tax monitoring of claim 39, wherein;

at least part of the supplementary user tax data for the current tax year associated with the user includes one or more types of supplementary user tax data selected from the group of types of supplementary user tax data consisting of:

data representing current tax year directives made by the user;

data representing tax related choices made by the user in the current tax year; and data representing tax related events associated with the user for the current tax year to date.

45. The method for providing year-round tax monitoring of claim 39, wherein;

at least part of the supplementary user tax data for the current tax year associated with the user is obtained from a computing system implemented data management system.

46. The method for providing year-round tax monitoring of claim 39, wherein;

automatically analyzing, by the first computing system, the estimate of the user's current year tax liability, the current year-to-date tax data associated with the user, and the supplementary user tax data for the current tax year associated with the user, comprises automatically projecting, by the first computing system, current year tax data for the user for the entire current tax year based on the current year-to-date tax data associated with the user and the supplementary user tax data for the current tax year associated with the user, and then automatically analyzing, by the first computing system, the projected current year tax data for the user for the entire current tax year and the estimate of the user's current year tax liability.

47. The method for providing year-round tax monitoring of claim 39, wherein;

the tax monitor widget is triggered to be displayed on the display device of the second computing system whenever the baseline tax data associated with the user, or the current year-to-date tax data associated with the user, or the supplementary user tax data for the current tax year associated with the user, or the applicable tax, changes.

48. The method for providing year-round tax monitoring of claim 39, wherein;

the tax monitor widget is a website support widget that is displayed on the display device of the computing system when supported websites are viewed.

49. The method for providing year-round tax monitoring of claim 39, wherein;

the tax monitor widget displayed on the display device of a computing system is updated whenever the baseline tax data associated with the user, or the current year-to-date tax data associated with the user, or the supplementary user tax data for the current tax year associated with the user, or the applicable tax law, changes.

* * * * *